| SYNC TIMING | CH-1 SALES 132 | | | | | | | | | | | | | | CH-2 REFUNDS 134 | | | | | | | | | | | | | | CH-3 ACTIVITY COUNTS 136 | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| ‖‖‖‖‖‖‖‖‖‖ 142 | STN-1 TOTAL CURRENT TRANS. PRICE | STN 15 — " " | STN 1 - TOTAL CURRENT TRANS. TAXABLE | STN 15 — " " | DEPT 1 TOTAL SALES PRICE | DEPT K " " | CLERK 1 TOTAL SALES PRICE | CLERK N TOTAL SALES PRICE | DRAWER 1 TOTAL SALES PRICE | DRAWER N TOTAL SALES PRICE | STORE TOTAL SALES PRICE | STORE TOTAL SALES TAX | | | STN-1 TOTAL CURRENT TRANS. REFUND | STN-15 " " | STN 1 - TOT. CURR. TRANS. REF. TAXABLE | STN-15 " " | DEPT 1 TOTAL REFUNDS | DEPT N TOTAL REFUNDS | CLERK 1 TOTAL REFUNDS | CLERK N TOTAL REFUNDS | DRAWER 1 TOTAL REFUNDS | DRAWER N TOTAL REFUNDS | STORE TOTAL REFUNDS | STORE TOTAL TAX REFUND | | | STN-1 TOTAL COUNT OF SALES | STN-15 — " " | STN-1 TOT COUNT OF REFUNDS | STN-15 " " | ITEM 1 TOT. COUNT OF SALES | ITEM 64 = TOTAL COUNT OF SALES | CLERK 1 TOTAL COUNT OF SALES | CLERK N TOTAL COUNT OF SALES | DRAWER 1 TOT. COUNT OF TRANSACTIONS | DRAWER N TOT. COUNT OF TRANSACTIONS | STORE TOT COUNT OF ITEM SALES | STORE TOTAL COUNT OF REFUNDS | STORE TOTAL COUNT OF TRANSACTIONS |

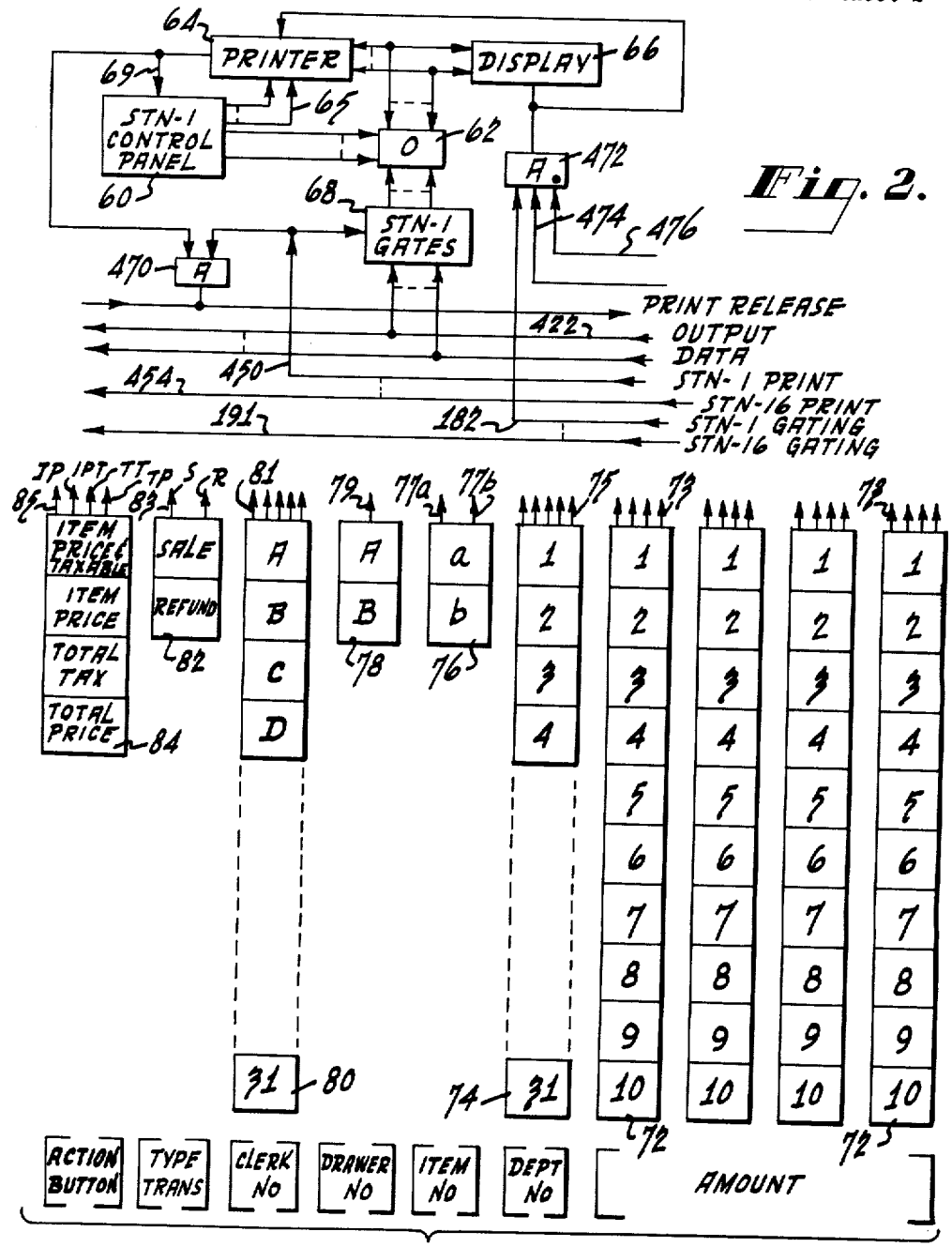

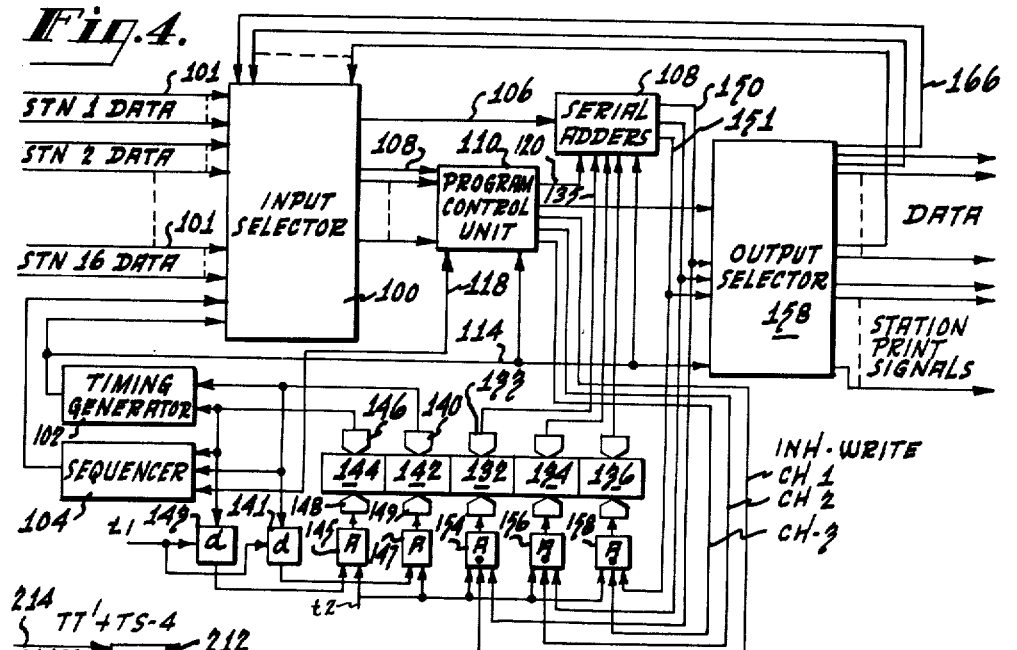

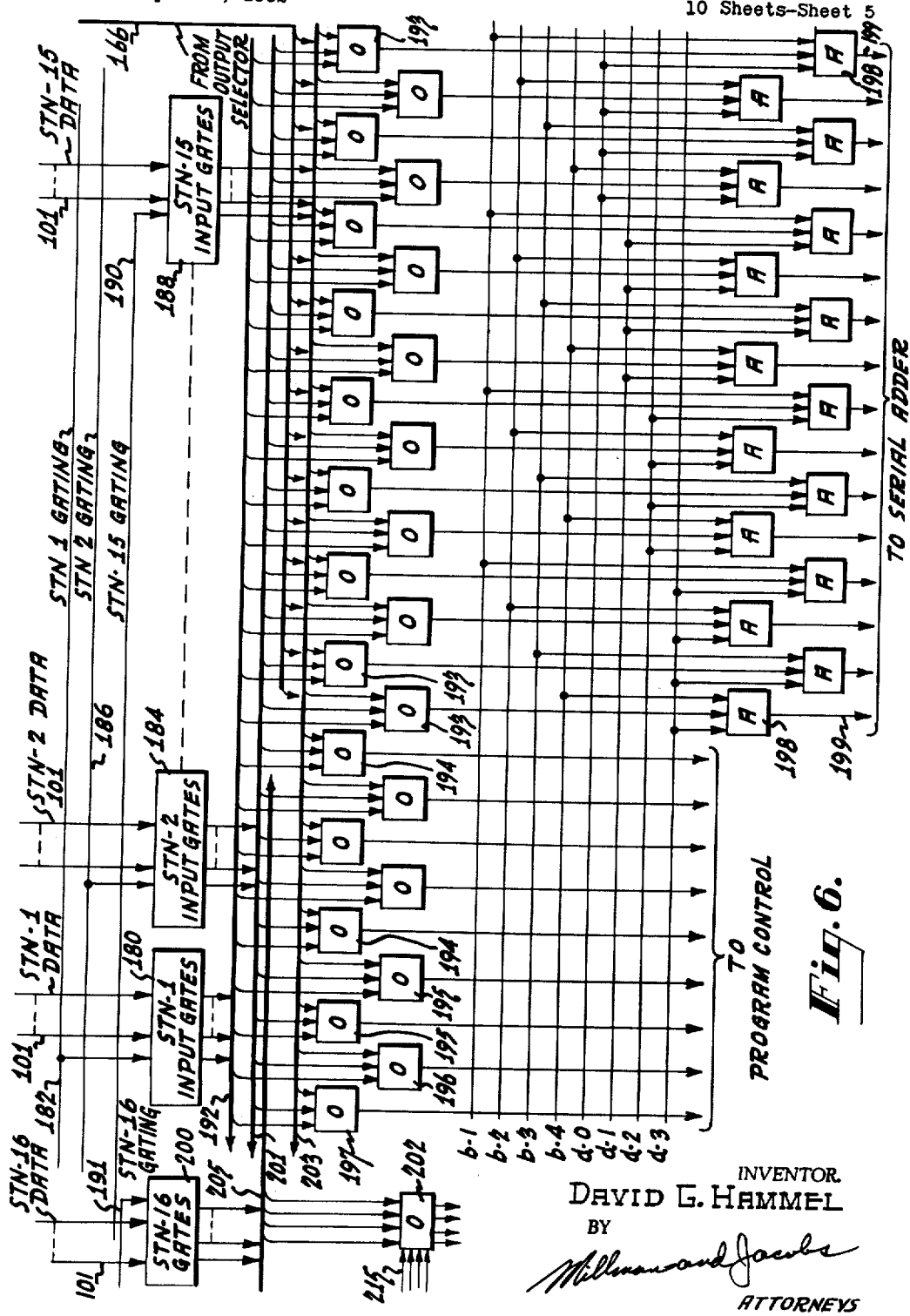

INVENTOR.
DAVID G. HAMMEL

INVENTOR.
DAVID G. HAMMEL

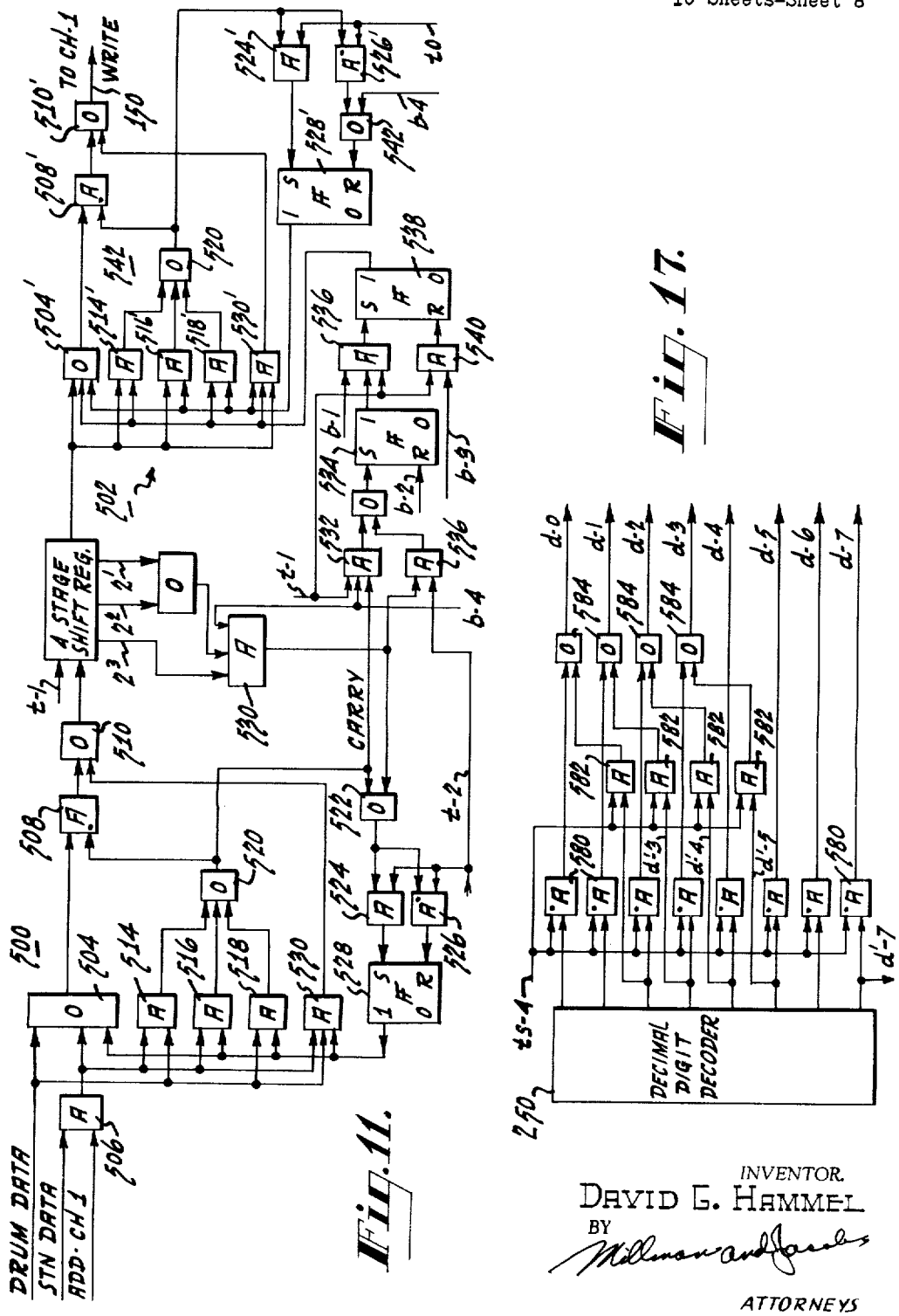

INVENTOR.
DAVID G. HAMMEL
BY
Millman and Jacobs
ATTORNEYS

INVENTOR.
DAVID G. HAMMEL

United States Patent Office 3,181,124
Patented Apr. 27, 1965

3,181,124
DATA PROCESSING SYSTEM
David G. Hammel, Riverton, N.J.
(Old Orchard Road, Sherborn, Mass.)
Filed Apr. 5, 1962, Ser. No. 185,431
19 Claims. (Cl. 340—172.5)

This invention relates to data processing systems and particularly to such systems adapted for handling the sales transactions of commercial establishments such as department stores and supermarkets.

The electromechanical cash register used in stores today is a basic part of such business establishments. These cash registers vary in capacity and complexity from a simple cash drawer to a relatively complex device which is able to accumulate on an inventory basis the sales activities in various departments, produce a detailed customer sales receipt, count the numbers of various activities and provide an output of the business data which is adapted for analysis of the overall transactions of the establishment.

However, the cash register generally has a limited capacity to accumulate data, both in terms of the overall totals of the prices of transactions as well as the count of the number of transactions. This is especially true with respect to the breakdown of accumulating figures and counts of activities for each of the different departments and sales personnel in the establishment. With the increased complexity of business establishments today, the need exists for finer and finer breakdown of the business transactions to keep management intelligently informed. Moreover, with large establishments, the requirement for large scale data processing of this information makes it necessary to provide an electromechanical link from the cash register to data processing equipment. However, such an electromechanical link is not sufficiently fast for electronic data processor equipment. An additional deficiency of the cash register is its physical size which tends to be bulky due to the large number of mechanical parts, and the noise of operation which is often disturbing. Moreover, the display of the numerical information to the operator and customer is often not clear.

Accordingly, it is an object of this invention to provide a new and improved sales transactions system, which can assume the various functions associated with the familiar cash register.

Another object is to provide a new and improved sales transaction system which employs electronic data processing principles.

Another object is to provide a new and improved sales transaction system which employs electronic data processing principles and which can communicate with other data processing systems at high speeds.

Another object is to provide a new and improved sales transaction system which has a large storage capacity and which can service a large number of clerk-operated cash drawers.

Another object is to provide a new and improved sales transaction system which has a large storage capacity and which can service a large number of clerk-operated cash drawers and which can be used for inventory updating and management monitoring at the same time.

Another object is to provide new and improved cash sales transaction system which occupies a relatively small amount of space and can be operated noise free and with a display of information to the operator and customer that is easy to read.

Another object is to provide an electronic sales transaction system which would permit the clerk-operated equipment to be small, quiet in operation, and easy to operate.

Another object is to provide an electronic sales transaction system which is economical in cost and operation.

Another object is to provide a new and improved sales transaction system employing eletcronic data processing techniques which is adapted to store a large amount of information and provide detailed inventory analysis of the various departments of the stores together with continuous access by store management to the day's operations in the various departments and of the various clerks thereof.

In accordance with this invention an electronic data processing system is employed for handling the common cash register transactions of a plurality of stations in a department store or supermarket or the like. A transaction central for a large number of cash drawer stations is provided, which transaction central includes a central storage, an arithmetic unit, and a central program control unit. The program control is arranged to couple sequentially each of the cash drawer stations to the storage and arithmetic units. In a small fraction of a second, each of the keyboard operations set up at the cash drawer stations is processed by the transaction central, and all of the stations are serviced in a cycle which is also the order of a fraction of a second. Thereby, the transactions of all the cash drawer stations are processed within the operating time of the station equipment and the sales clerk operating that equipment.

The transaction central, upon being coupled to one of the cash drawer stations, obtains from the storage the appropriate previous transaction information, updates it in accordance with the new transaction data set up at the cash drawer station by means of the arithmetic unit, restores the results, and transmits back to the coupled station the appropriate totals and related information. A display at the station presents the information for the operator and customer, and a printer records the transaction data to provide a printed receipt.

A feature of this invention is that of the transaction central providing a control cycle for the cash drawer stations. Each of the stations is coupled in a certain sequence to the transaction central and remains coupled thereto for a certain time period suitable for processing the transaction or part of the transaction set up on its keyboard.

Another feature of this invention is that the storage unit is accessible for supervisory interrogation to monitor the transactions of the different stations and of the different departments.

Another feature of this invention is that supervisory monitoring and inventory updating operations may be performed without interfering with the sequential cycle of the cash drawer stations and the processing of the transactions by the transaction central.

The foregoing and other objects of this invention, the various features thereof as well as the invention itself, may be more fully understood from the following description when read together with the accompanying drawings, in which:

FIG. 2 is a schematic block diagram of an operator-controlled cash drawer station that may be used with the parallel system of FIG. 1 and with the serial system of FIG. 4;

FIG. 3 is a schematic layout diagram of a portion of the keyboard of the cash drawer station of FIG. 2;

FIG. 4 is a schematic block diagram of a transaction central system embodying this invention and employing serial signal transmission;

FIG. 5 is a schematic diagram of a portion of a magnetic drum storage unit for the system of FIG. 4 and of the layout of information in three channels thereof;

FIG. 6 is a schematic logic and block diagram of the Input Selector portion of the system of FIG. 4;

FIG. 7 is a schematic logic and block diagram of the Sequencer of FIG. 4;

FIG. 11 is a schematic logic and block diagram of a Serial Adder of FIG. 4;

FIG. 17 is a schematic logic and block diagram of a switching network of FIG. 8.

In the drawing, corresponding parts are referenced by similar numerals throughout.

Figure 1:
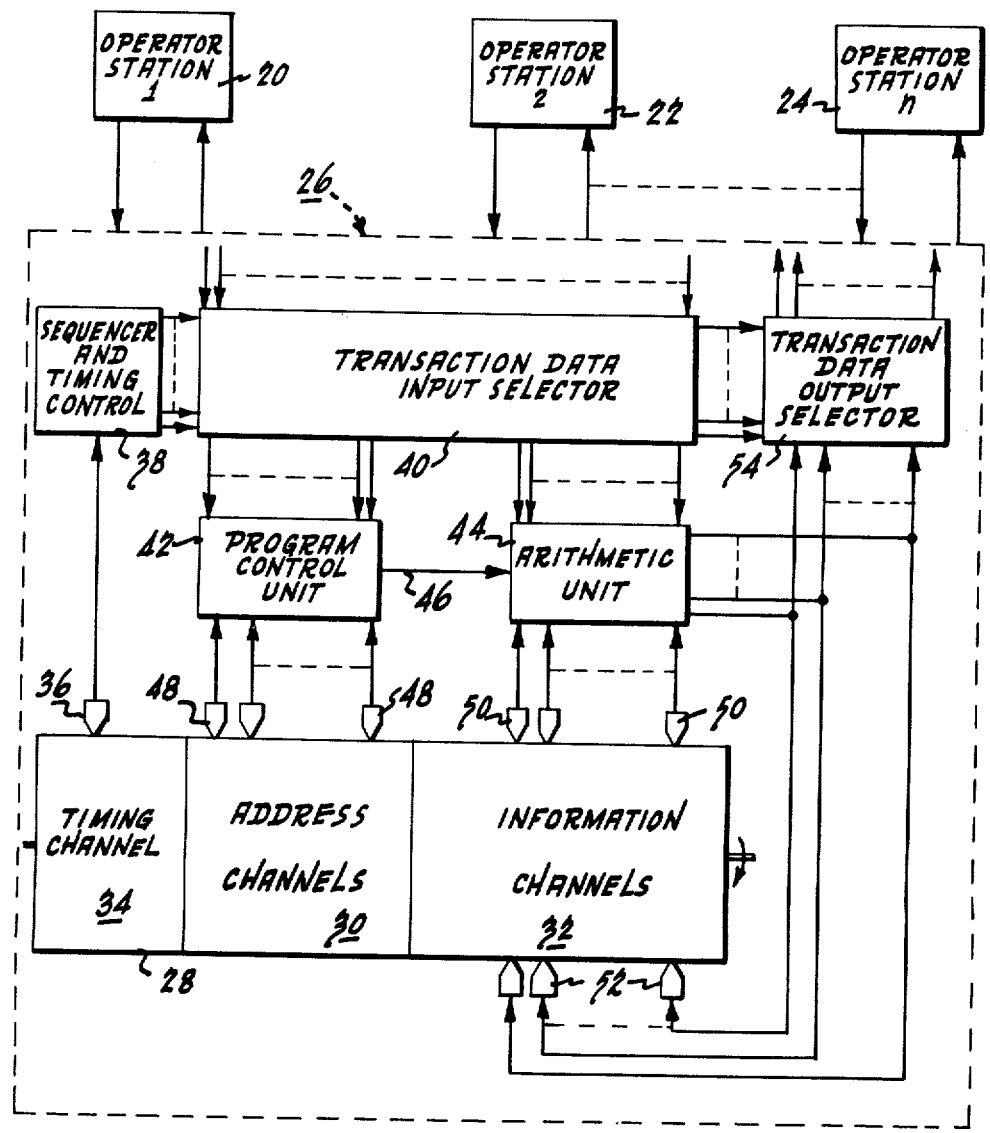
FIG. 1 is a schematic block diagram of a sales transaction system embodying this invention and employing parallel signal transmission.

In FIG. 1, a schematic block diagram illustrates a sales transaction system embodying this invention. A plurality of operator stations 20, 22, and 24 represent cash-drawer transaction units that may be variously located in a store such as a department store or supermarket. These stations are arranged with cash-drawer transaction units such as are illustrated in FIGS. 2 and 3 to supply information to a transaction central 26 and to receive information back therefrom for display and print out. Three such stations 20, 22, 24 are illustrated, and in principle, these may be any number represented by n.

The transaction central 26 includes a storage device in the form of a continuously rotating magnetic drum 28 arranged for the binary storage of digital information in any suitable manner. A plurality of parallel address channels 30 around the drum store binary coded signals that identify various stations, departments, or clerks, etc. with respect to which information of various types may be stored. The applicable information is stored in a group of associated parallel information channels 32 in the form of binary coded signals. In addition, a timing track or channel 34 is provided which contains a timing pulse at every bit position around the circumference of the drum, which timing pulses are read by a recording head and amplifier 36 for synchronization of the entire operation of the transaction central 26. An index track may also be provided in the channel 34 to provide a sync signal at the start of each drum revolution. The timing pulses are supplied to a sequencer and timing control 38 which supplies signals to control the operation of a transaction data input selector 40 that receives the information lines from the stations 20, 22, 24.

The input selector 40 includes a gating system that is enabled by the sequencer and timing control 38 to accept the signals from only one of the stations, and that supplies address signals to a program control unit 42 and information signals to an arithmetic unit 44. The program control unit also receives address signals from the drum channels 30 for comparison with the addresses supplied from the stations 20-24. The program control unit 42 controls the arithmetic operations in the unit 44 by appropriate signals in a plurality of parallel lines 46 (only one of which is illustrated). The program control unit receives the signals from the address channels 30 via reading heads and amplifiers 48 and compares them with the address signals of the station to locate the proper portion of the drum that contains the information to be processed. The arithmetic unit 44 receives the associated information signals in proper time relation from the channels 32 via reading heads and amplifiers 50 under control of the program control unit when the proper portion of the drum is located. The arithmetic unit performs simple arithmetic operations such as addition in a uniform time period.

The output signals from the arithmetic unit 44 are returned to the information channels 32 by way of write heads and amplifiers 52 which effectively write over previously stored information. The recording system may be any suitable type such as return-to-bias, so that erasure is accomplished by writing 0's. The heads 52 are spaced circumferentially around the drum 28 from the reading heads 50 in order to provide a time displacement corresponding to a certain part of the drum rotation. This time displacement is the same as the operating time of the arithmetic unit which is arranged to be uniform. Thereby, signals may be automatically and uniformly written back in the same address of the information channels 32 after the arithmetic operations have been performed. The outputs of the arithmetic unit 44 are also connected to an output selector 54 which includes a plurality of gates controlled by the squencer and timing control 38 in a manner similar to the input selector 40 to supply the output signals to the appropriate one of the stations 20-24 that is then coupled via the input selector 40.

In overall operation, one of the stations 20-24 is coupled to the transaction central 26 at any time. The determination of which station is so coupled is by means of the sequencer 38 that enables certain gates of the input selector 40. The station which is so coupled supplies transaction data together with identification data via the input selector to the program control unit 42 and arithmetic unit 44. The program control unit 42 locates the appropriate portion of the drum 28 at which relevant information is stored and controls the read-out of that information to the arithmetic unit 44 so that appropriate computations may be performed, be they totalling of price, updating of inventory, or any other appropriate operation, all of which may be assumed to be a simple operation of addition or counting. The output of the arithmetic unit is then read back into the appropriate information channels at the proper address on the drum 28. These output signals are also fed via the output selector 54 to the same station that supplied the input information and which is still coupled to the transaction central 26. Upon completion of this read-out operation, corresponding to the completion of a full drum revolution, the timing control 38 enables a different group of gates of the selectors 40 and 54, and the next station is coupled to the transaction central. The operating cycle of the latter is then repeated.

In this fashion, each station 20-24 is coupled to the transaction central 26, and the transaction operation established on its keyboard is processed by the central 26 in a small fraction of a second. The next station is coupled in thereafter. The entire cycle for all of the stations 20-24 is completed within a fraction of a second so that the operators at these stations may perform their keyboard controls within a normal operating time without being held up by operation of the transaction central or by the other operators operating at their own stations. Thus, each operator station may be operated at full speed with the electronic transaction central processing its transaction as required and essentially independently of the other stations.

In FIG. 2 a block diagram of a cash-drawer station is illustrated. A control panel 60 includes a keyboard operated switch panel such as is shown in FIG. 3 together with the switches and relay circuits that are appropriate therefore. These signals may be in binary form generally, and for decimal amount data the signals may be binary-coded-decimal. Suitable switching circuits for establishing such binary signals in response to the depression of the control panel keyboard keys are well known in the art. The binary signals representing price data are supplied in parallel on separate lines via individual OR gates 62 to a cash-receipt printer 64 and to a visual display device 66. Identity signals to be printed such as clerk and department are supplied directly to the printer 64 via lines 65. The printer 64 for each station is arranged to print the associated station identity for each transaction. A set of gates 68 passes output price data signals supplied from the transaction central, and these signals are buffed with the data from the control panel 60 in corresponding one of the OR gates 62 for printing and display.

Printers (such as the solenoid operated type) and display units (such as cold cathode neon decimal display tubes) that are suitable for use in this system are well known in the art.

The station control panel 60 also has connections to the controls (not shown) of the cash drawer; for example, a control that may be used to open the cash drawer upon completing the transaction. The printer 64 supplies a Release signal on line 69 to the control panel 60 upon completion of the printing operation to release the keyboard which is locked when an operating cycle is started.

An arrangement of a cash-drawer station control panel illustrating the layout of the keyboard is shown in FIG. 3. Four columns of ten keys 72, by way of example, are used to enter the decimal amount of the transaction. The keys 72 actuate electrical switches in a well known manner to establish binary-coded-decimal signals on an associated group of four parallel leads 73. Keys 74 represent the department from which the item is being sold; for example, the meat or grocery departments of a supermarket. By way of example, thirty-one such department keys are provided in any suitable arrangement, and they actuate switches to produce a binary coded representation on five parallel leads 75. Two keys 76 represent specific items to be inventoried from the department controlled by the keys 74, though as many others as desired may be added. Representative control signals Item-a and Item-b are generated thereby respectively on leads 77a and 77b. Two keys 78 control the particular cash drawer to be opened under control of the clerk, and a binary representation thereof is established on lead 79. One of a plurality of keys 80 identifies the clerk operating the cash-drawer station. Thirty-one such keys are assumed by way of illustration, and they generate binary representative signals on five leads 81. Two keys 82 identify the type of transaction (for example, whether a sale or a refund) and signals therefor are generated on lines 83.

Four keys 84 are used to specify the type of processing operations to be performed, and four individual leads 85 receive corresponding control signals. For example, these control signals represent the insertion of the price of a single non-taxable item (IP), the insertion of an item price that is taxable (IPT), the total untaxed price (TP) for an entire series of items making up a transaction, and the total tax (TT) on the taxable series of items.

The keys 78 and 80 for the drawer number and clerk number may be arranged to be continuously depressed once actuated so that the same clerk continuously using this station need not depress these keys for each transaction. Other arrangements of the keyboard in a manner consistent with normal cash register construction may be provided. For example, in a well known manner, the keys may be latched when depressed, and a solenoid-operated latch release provided for releasing the keys upon completion of a processing operation. The Release signal from the printer 64 may be used for this purpose; thereby, the control panel signals are continuously supplied on the output lines thereof until the processing operation is completed and the Release signal is supplied.

In FIG. 4 a transaction central system is shown in which the storage and transmission of information is in serial bit-by-bit fashion. This system is adapted for operation with the cash-drawer station of FIGS. 2 and 3. An Input Selector 100 receives control signals and identity and amount data signals from the different stations in parallel via lines 101 (representing the lines (FIG. 3) from the keyboard switches), and also receives timing signals from a Generator 102 and station identification signals from a Sequencer 104. The output of the Selector 100 in the form of price data is transmitted bit-by-bit serially via the line 106 to Serial Adder units 108. Various identity data signals and control signals such as those of key columns 74-84 are supplied via lines 108 to the Program Control unit 110. The Program Control 110 also receives timing signals from the Generator 102 via the line 114. The Program Control 110 supplies control signals via line 118 to the Sequencer 104 to control the operation of that unit.

The Program Control unit also provides control signals via line 120 to the Adders 108, and via line 122 to write gates 154, 156, 158 so as to control the writing of signals in the proper address on the storage drum 130. The storage drum 130 has three channels 132, 134, and 136 which have binary signals stored therein in serial fashion therearound in a suitable manner; for example, as shown in FIG. 5. The outputs of the respective read heads and amplifiers 133 for these channels 132-136 are supplied to three Serial Adders 108 individually associated with the three drum channels 132, 134, 136.

In addition, a read head and amplifier 140 reads a timing track 142 on the drum which supplies timing signals to the Generator 102 for each bit position around the circumference of the drum. An index channel 144 supplies a Sync signal via the read head and amplifier 146 to the Sequencer to initiate the stepping of that unit with each drum revolution; this Sync signal is directed also to various other parts of the system as is described below. This index channel 144 has a single bit in the track which references a starting point on the circumference of the drum. The timing and Sync signals are also recirculated via delay elements 141, 143 and gates 145, 147 and rewritten in the associated tracks by write heads and amplifiers 148 and 149. The latter heads are spaced a suitable distance circumferentially around the drum from the read heads.

The outputs of the Serial Adders 108 are supplied via lines 150, 151 and AND gates 154, 156, 158 and write heads and amplifiers 152 for the three channels 132-136. These write heads 152 are positioned at a certain spaced distance around the drum from the read heads (the same distance as that for the write heads for the timing and index tracks 142 and 144) so that information signals produced at the output of the adders 108 are automatically written in the same phase relation as the timing and sync signals. Therefore, the information signals are written at the corresponding address locations from whence they were read by the read heads. The maintenance of the phase relations is due to a uniform time of operation of the Serial Adders 108 for each transaction. This Adder time corresponds to the recirculation time delay of the timing and sync signals which is greater than the time of rotation of a bit storage position on the drum from the read heads to the write heads. Erase heads (not shown) are located between the read and write heads to erase the tracks continuously after they are read. The information that is read is recirculated to the write heads via the Serial Adders with or without an addition operation thereon, as is explained below.

The outputs of the Adders 108 are also supplied to an Output Selector 158 which also receives timing signals from the Generator 102, and control signals from the Program Control 110. Outputs of the Selector 158 in the form of data are supplied via AND gates 68 and OR gates 62 (FIG. 2) to the printer 64 and display unit 66 of the station which is coupled to the transaction central and which supplies the input data thereto. Feedback of information signals from the Output Selector 158 to the Input Selector is in parallel via the lines 166 for a purpose to be explained in detail hereinafter.

In FIG. 6 the logic of the Input Selector 100 is illustrated in block diagram form. The output lines 101 from Station–1 (that is, lines 73, 75, 77a and b, 79, 81, 83, and 85) are connected individually to a corresponding plurality of input AND gates 180. Each one of those gates 180 is enabled by an STN–1 Gating signal from line 182, which line is supplied with its gating signal by the Sequencer 104. In a similar fashion, a set of input gates 184 receives signals respectively from the lines 101 from Station-2 and is enabled by STN–2 Gating signals on line 186 from the Sequencer, and so on, with Station-15 supplying its signals on data line 101 to gates 188 that are enabled by the STN–15 Gating signal 190. Station-16 is a monitor station that also has connections to the Input Selector 100 as is described below.

The outputs of the STN–1 gates 180 are distributed via a cable 192 individually to sixteen OR gates 193 and to a plurality of other OR gates 194 and 197. Each of the four binary bit lines making up one of the four decimal digits supplied as price data is connected to one of the OR gates 193. Each of the lines carrying a signal making up one of the identity data digits (developed by the keys 74–84 of FIG. 3) is individually connected to one of the OR gates 194, 195, 196, 197. Only nine such OR gates 194–197 are illustrated corresponding, for example, to the eight lines from the keys 74, 76, 78, and one of the lines from keys 80. Similar groups of ORs are provided, but not shown, for the other lines from keys 80, 82, and 84. The construction for the latter OR gates is the same as for the others. An additional set of OR gates 202 in the Input Selector 100 mixes station identity signals from the Sequencer 104 and from Station–16, the monitor station.

The outputs of the OR gates 193 are individually connected to sixteen AND gates 198, each of which also receives gating signals from one of a group of four bit lines b–1 to –4 and one of a group of four decimal lines d–1 to –4. The bit and decimal lines are connected from the Timing Generator 102 (FIG. 8) and receive the timing pulses in proper sequence therefrom as described below. The outputs 199 of the AND gates 198 are connected directly to the Serial Adders 108 for channels–1 and –2.

In a similar fashion, the outputs of the STN–2 gates 184 are distributed via a cable 201 to the OR gates 193–197, with lines for corresponding bit positions and decimal digit groups and control signals being connected to the same OR gates as those of the Station–1 lines; and so on for the other station gates, with the STN–15 gates 188 being arranged to have their outputs connected via a cable 203 to the OR gates 193–197 in a similar fashion. The cable 166 containing the feedbback lines from the Output Selector distributes those lines to the price data OR gates 193 in a similar fashion; this feedback connection is for tax computation purposes as is described below. For tax purposes, five decimal digits may be recirculated; in this case, an extra set of four AND gates 198 are provided for the fifth digit.

A set of STN–16 input gates 200 receives the Station–16 signal lines together with the STN–16 Gating signal on line 191, and the outputs are distributed via cable 205 to the appropriate OR gates 194–197 for the identity data (Station–16, the monitor station, does not supply any price data). In addition, Station–16 supplies station identity signals, the gated lines of which are respectively distributed to OR gates 202 together with the corresponding lines 215 from the Sequencer Counter 219 (FIG. 7).

The output lines from the identity and control OR gates 194–197 and 202 are all connected to the Program Control unit 110. Other special control-signal lines from the Monitor Station gates 200 are connected directly to the Program Control unit 110.

The Sequencer logic is shown in FIG. 7. A 4-stage binary counter 210 receives pulses to be counted from an AND gate 212. The inputs to the gate 212 include a line carrying the Sync pulses that index the start of each drum revolution, and input line 214 which carries signals associated with the tax operation and which enable the gate 212 (namely, signals TT' representing the absence of a tax operation, or TS–4 representing the fourth step of such a tax operation). In addition, gate 212 receives signals from the line 216 which represent either a Print-Out Conflict or an End-Of-Sequence, and which are effective to inhibit that gate 212. The inhibit input to a gate is represented throughout the drawing by a dot at the arrowhead of the input lead.

The outputs of the counter 210 on lines 215 are decoded in a set of AND gates, 218, 220, 222 which receive different combinations of the counter outputs. Thus, the first gate 218 receives that combination of output lines of counter 210 representing a count of 1, and provides an enabling signal STN–1 Gating, on line 182. The second gate 220 receives the combinatorial outputs representing a count of 2 and supplies the enabling signal STN–2 Gating on line 186, and so on. In addition, the gates 218–222 receive STN-Ready signals associated with their respective stations; this Ready signal for each station is derived by mixing the action button signals IP, IPT, TT, and TP of the station register keyboard (FIG. 3) in an OR gate (not shown). The pertinent action button 84 is the last one actuated by an operator to initiate an operation.

All of the decoder AND gates 218–222 receive Print-Out Conflict as an inhibiting input signal. Also, all of these gates 218-222 receive, via OR gate 230, either the Sync–d signal (the Sync signal slightly delayed to permit the Counter 210 and other elements to be previously operated by the Sync signal itself) or a Set-Up signal from the 1–output of a flip-flop 232. The output from gate 218 is the STN–1 Gating signal; from gate 222, the STN–2 Gating signal, and so on, with the output of gate 222 (enabled by a count of zero in Counter 210) being the STN–16 Gating signal.

The STN Gating lines 182, 186, 191 are connected via OR gate 234 to the set (S) input of flip-flop 232. The latter flip-flop 232 is reset by the Sync signal or by a Manual Reset signal supplied on line 236. The Manual Reset signal is supplied by a master switch, not shown, that is used to turn the machine on.

In operation, the Sequence Counter 210 is stepped each time a Sync pulse is supplied by read head 146 with the start of a new drum revolution. The count registered in the sequence counter is decoded by one of the gates 218–222 when an STN-Ready signal is supplied by one of the lines 224–228 and when the Sync–d pulse is supplied thereto. Under those circumstances, the appropriate one of the gates 218–222 is enabled, and the associated STN-Gating signal is generated.

The output of the enabled gate is used to set the flip-flop 232 which generates the Set-Up signal, and the latter is fed back to maintain the STN-Gating signal for a full drum revolution. Upon the termination of the drum revolution and the generation of the new Sync pulse, the flip-flop 232 is reset, and the STN-Gating signal previously developed is terminated. A short time later, when the Sync–d pulse is supplied to the decoder gates 218–222, the new count in the Sequence Counter 210 has been developed, and the next decoder AND gate in sequence is enabled if the STN-Ready bit of its associated station has previously been established on one of the lines 224–228. If so, then that gate is enabled, and the associated STN-Gating signal developed in the manner described above.

If there is a Print-Out Conflict signal supplied (the generation of which is described below), the gates 218–

222 are all inhibited, and none of the STN-Gating signals are developed. Also, if there is a Print-Out Conflict, the stepping of the Sequence Counter 210 is inhibited by way of the inhibit input of gate 212. The performance of the tax operation, controlled by signal TT, usually requires a plurality of drum revolutions, and this signal TT on line 214 inhibits gate 212 and effectively prevents the stepping of the Sequence Counter by the Sync pulse while the tax operation is performed.

The Manual Reset signal on line 236 insures that FF-232 is reset when the machine is initially turned on to insure that only the next Sync pulse can develop an STN-Gating signal and that a station's inputs are gated in proper synchronization. The Sequence Counter 210 may be left to recycle continuously, if desired. However, if less than the full counting sequence of that counter 210 is utilized, the counter 210 may be reset earlier by and End-of-Sequence control 233. This control 233 receives as inputs the Sync-d pulse and the corresponding count of counter 210 at which the sequence terminates (these inputs 235 are connected from the corresponding counter outputs). The control 233 includes an appropriate gate (such as the gates 218, 222) arranged to recognize the desired count and supply a pulse to the S-input of a flip-flop 237. The 1-output of FF-237 and the next Sync pulse generate a pulse via gate 238 to reset the Counter 210. This reset pulse appropriately delayed is used to reset the flip-flop 237. The 1-output of FF-237 is also supplied via OR 239 to inhibit the stepping of the Counter during this reset operation. Thus, with this arrangement, no time need be lost in the squencing operation by unused steps of the Counter 210.

Thus, the Sequencer is effective to generate the STN-Gating signals in sequence, recycling through a sequence in a fraction of a second corresponding to the number of drum revolutions for a complete sequence of stations. Each station, if ready with a transaction as indicated by its STN-Ready bit being available on lines 224–228, is then effectively coupled into the transaction central; the coupling action is by its associated STN-Gating signal which is supplied to the Input Selector 100 (FIG. 6) on lines 182, 186, and 190.

In normal operation, it may be expected that the appropriate STN-Ready bit on lines 224–228 is available each time the Counter 210 is stepped to the associated count. In this case, the associated one of the gates 218–222 is enabled; FF-232 is set; and the Set-Up signal is established via OR gate 230 to maintain the gate enabled. The initial opening of the proper gate 218–222 is by the Sync-d signal which insures that the STN-Gating signal is developed at the start of each drum revolution. The STN-Gating signal is maintained for a full drum revolution until the next Sync pulse resets FF-232. If a station does not supply its STN-Ready bit when the Sequence Counter 210 is stopped to the associated count, the associated gate 218–222 is not enabled, and FF-232 remains reset for the associated drum revolution. Thus, only those station messages which are set up, as indicated by the associated STN-Ready bit being developed prior to the Sync-d signal, are interrogated by the proper STN-Gating signal.

Figure 8:
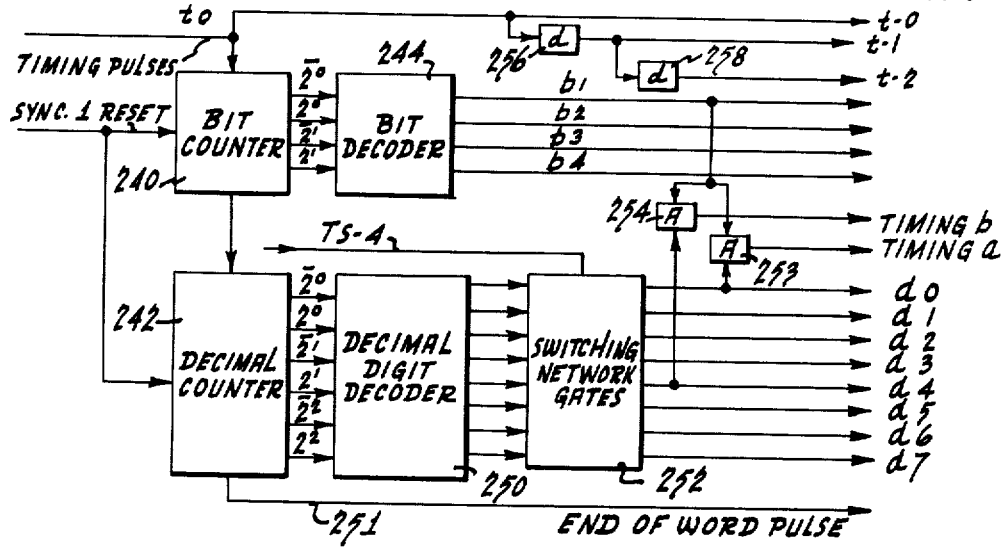
FIG. 8 is a schematic logic and block diagram of the Timing Generator of FIG. 4.

The Timing Generator shown in FIG. 8 includes a bit counter 240 and a decimal counter 242; the first of which is a 2-stage binary counter which counts timing pulses t-0 read from track 142 on the storage drum 130. Counter 240 counts cyclically and supplies an overflow pulse at each count of 4 to the decimal counter 242. The latter is a decimal digit counter that counts the cycles of four bits in the bit counter 240, and includes a 3-stage binary counter arrangement. The outputs of the bit counter are decoded in a set of gates shown as bit decoder 244 to provide bit timing signals b-1 to -4 on four separate lines. The eight output lines of the decimal counter 242 are supplied to gates of a decimal decoder 250 which converts the binary combinatorial outputs of the counter 242 to signals on eight individual lines representing the decimal timing signals d-0 to -7. In addition, the overflow pulse from the counter 242 is used as an End-Of-Word pulse for the Program Control unit. The lines for decimal signals d-1 to -7 are gated in a set of gates by the TS-4 signal (as described below) so that these signals are available in proper time relationship for the tax operation. The d-0 line and the d-4 line are respectively connected as inputs to two AND gates 253, 254, which both receive the b-1 signal as another input. The outputs of the gates 253, 254 are lines respectively represented as Timing-a for the b-1 and d-0 signal combination, and Timing-b for the b-1 and d-4 signal combination.

The t-0 timing pulses read from the drum track 142 are supplied to two delay elements 256 and 258 in cascade. The time delays of these elements 256 and 258 are chosen to be about one-third of a pulse period, and their respective outputs t-1 and t-2 are pulses that form, with t-0, three pulses that equally divide each pulse period. The t-0 pulse occurs at the leading edge of an information bit pulse read from the drum.

Figure 10:
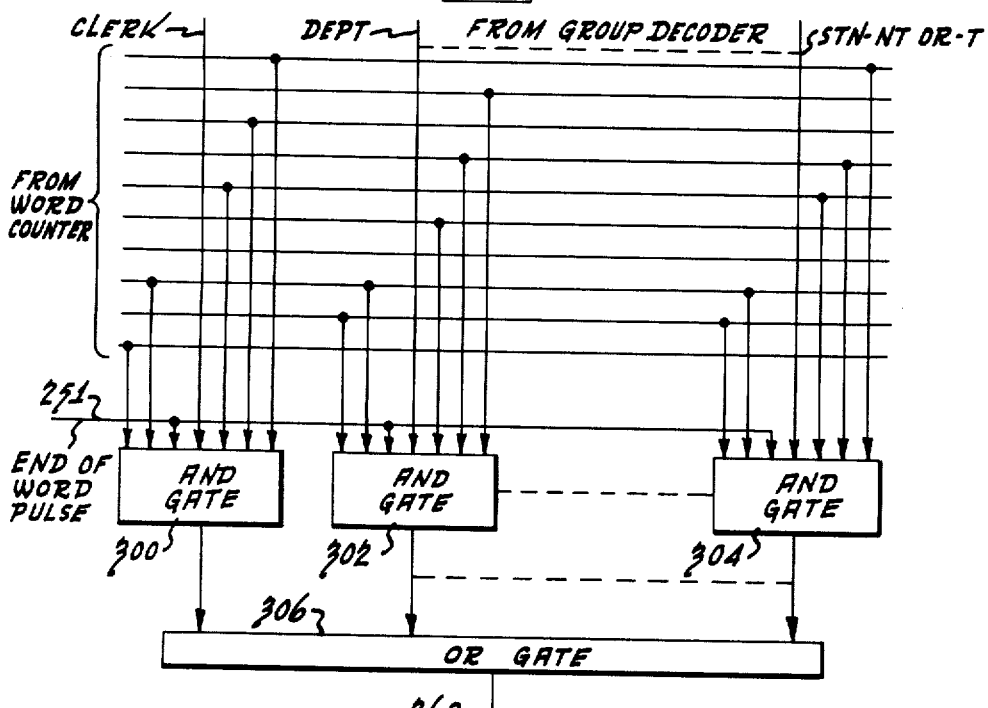
FIG. 10 is a schematic logic and block diagram of a portion of the switching network of FIG. 9.
Figures 9, 13:
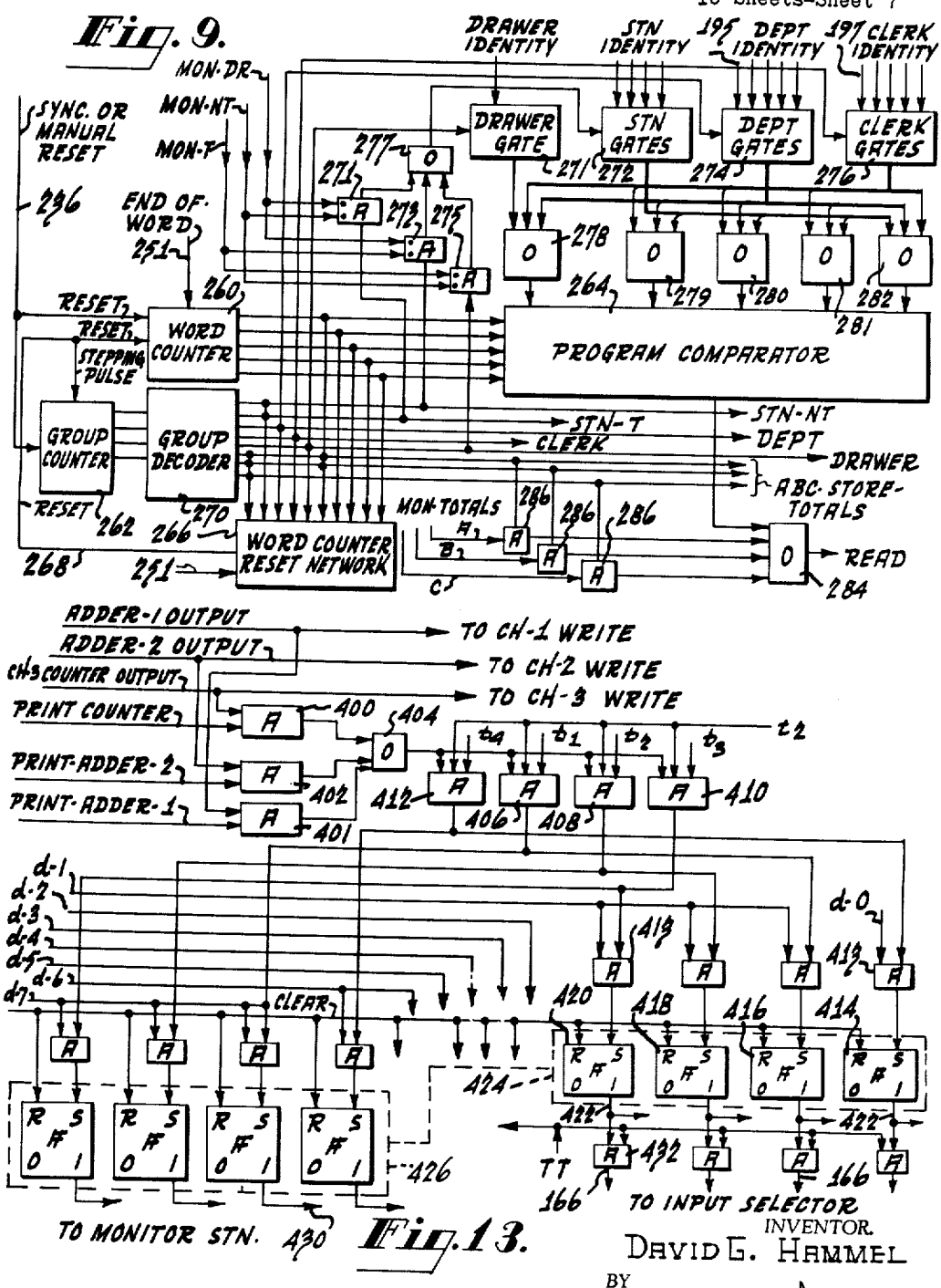
FIG. 9 is a schematic logic and block diagram of a portion of the Program Control unit of FIG. 4.
FIG. 13 is a schematic logic and block diagram of a portion of the Output Selector of FIG. 4.

The logic of the Program Control unit is shown in FIGS. 9, 10, 15, and 16. In FIG. 9, the Program Control unit includes a word address counter 260 and a group address counter 262. The word counter 260 is a 5-stage binary counter that is stepped by the End-Of-Word pulse on line 251 from the Timing Generator (FIG. 8). The word counter is reset to a count of 1 since its count is used to represent the identity codes in the Program Control, and the combination of all binary zeroes is not used as an identity code except for that of the monitor station in the sequencer. Thus, the word counter 260 can step through thirty-one words which is sufficient to accommodate the total possible number of stations, departments, items, or clerks that are assumed for the example illustrated herein. The output lines of the word counter 260 are supplied to the inputs of a program comparator logic 264. These counter outputs are also connected as inputs to the reset network 266 for the word counter (which network is illustrated in FIG. 10). The output line 268 of the network 266 is connected back as a reset input for the word counter 260.

The binary outputs of the group address counter 262 are decoded in a group decoder 270 on eight output lines (the counter 262 having three binary stages). The eight output lines of group decoder 270 are: Station-NT, Station-T, Department, Clerk, Drawer, and Store Totals-A, -B, and -C (the latter being control signals relating to the corresponding three drum sections shown in FIG. 5). These group decoder output lines are also connected to four sets of gates 271, 272, 274, and 276, which respectively control the passage of drawer, station, department, and clerk identity signals. That is, a single drawer gate 271 receives the drawer identity line from the associated OR 196 in the Input Selector (FIG. 6) together with the enabling signal from the Drawer line from the group decoder 270. The station gates 272 receive the four station identity lines 215 from the Sequencer (FIG. 7) together with a gating signal developed from the STN-NT, STN-T, and Drawer lines of the group decoder 270 (via AND gates 271, 273, and 275 buffed together in OR gate 277; the latter AND gates also receive inhibit inputs from the Monitor station as described below). In a similar fashion, the department gates 274 and clerk gates 276 receive the corresponding identity input lines from the Input Selector, and the associated Department and Clerk output lines directly from the group decoder 270.

The five output lines of each of the groups of five gates in 274 and 276 are distributed to five OR gates 278 with the most significant bit of the identity data being distributed to OR 278, and the least significant to OR 282, and corresponding bits to the intermediate OR gates. The four outputs of station gates 272 are similarly distributed to OR gates 279–282, and the single output of drawer gate 271 is connected as an input to the most significant OR 278. The outputs of the OR gates 278–282 are supplied as a second set of inputs to the program comparator 264. The output of the program comparator 264 is connected via an OR gate 284 to a control line which carries the Read-signal. The program comparator 264 may use any suitable logical scheme for detecting coincidence between all of the bits of the word counter and those of the identity data. The comparator generates a pulse at the time coincidence is detected, which pulse lasts for the duration of the coincidence, which is for the period of the eight digit count in the Timing Generator (FIG. 8).

Store–Totals–A, –B, and –C control lines are also individually connected to three gates 286, each of which has its output connected to OR 284 to generate the Read signal. The gates 286 also receive control lines Mon–Totals–A, –B, and –C, respectively, from the Monitor station.

Both the word address counter 260 and group address counter 262 are reset by the Sync or Manual Reset signal on line 236. The word counter reset signal on line 268 is also used as a stepping pulse for the group address counter 262.

The order in which the outputs of the group decoder 270 are enabled corresponds to that in which the corresponding information is stored on the drum as shown in FIG. 5.

The logic of the word counter reset network 266 is shown in FIG. 10. A plurality of AND gates 300–304 is provided; as shown, gate 300 receives the Clerk output of decoder 270, gate 302 receives the Department output of the decoder 270, and gate 304 receives the Station–NT and –T outputs buffed together from the decoder 270. In addition, other AND gates (not shown) receive the drawer and Store-Totals outputs, respectively. In addition, these gates 300, 302, 304 receive the word counter outputs which combinatorially correspond to the number of clerks and departments provided on the keyboard (FIG. 3) and the number of stations in the overall system, and twice the number of clerk stations for the drawer count since there are two drawers at each station. These numbers correspond to the numbers of word storage sections provided therefor consecutively around the periphery of the drum (FIG. 5); only a single word section is provided for each of the Store-Totals. Thus, if there are thirty-one clerks to be provided for in the system, gate 300 receives the word counter outputs corresponding to the count of 31; and similarly gate 302 for the number of departments, and gate 304 for the number of stations, and so on.

The word counter 260 is stepped successively by the End-of-Word pulses, and when it reaches the count associated, for example, with the number of clerks, the gate 300 is enabled thereby and by the Clerk output signal from the group decoder 270. The enabled gate 300 passes the next End-of-Word pulse from the line 251 (which is also connected as an input to each of the gates 300–304) via OR gate 306 to the line 268 to reset the word counter 260 and step the group counter 262. This process is repeated for the next grouping, which would be the drawer grouping for the illustrated embodiment. When the word counter is stepped to the number of drawers allotted, the word counter is again reset, and the group counter is again stepped, and so on.

The operation of locating the proper section on the drum for read-out of the appropriate portion thereof is as follows: The count established in the Sequencer counter 210 determines which station may supply its identity data to the Program Control unit via the Input Selector. That is, one of the STN–Gating signals is established on lines 182, 186, 191 (FIG. 7) to enable the corresponding set of Input Selector gates 180–188 (FIG. 6). The identity data is distributed via the OR gates 193–197 to the associated gates 271, 274, and 276 in the Program Control unit (FIG. 9), and the station-identity lines from the Sequencer counter 210 (FIG. 7) are distributed to the station gates 272.

These operations are performed upon the receipt of the Sync pulse representing the start of a drum revolution; which Sync pulse resets word address counter 260 and group address counter 262. In the initial count position of the group counter 262, the STN–NT line of the group decoder 270 receives an enabling signal which is supplied to the station gates 272 to pass the station-identity data into the program comparator 264. The word counter 260 is stepped each time that a word around the periphery of the drum passes the read heads; a word corresponds to eight decimal digits of rotation which is the amount of storage provided for each of the stations–1 to –16.

When a station count established in the word counter 260 corresponds to the station identity data at the gates 272, the program comparator 264 recognizes the coincidence and supplies a pulse via OR 284 to provide a Read signal. The Read signal is used to enable certain control circuitry to utilize as required the next eight decimal digits that are read out from the drum. Upon completion of that read-out, the word counter 260 is stepped by the next End-of-Word pulse so that the comparator 264 no longer detects coincidence, and the Read signal terminates.

The word counter 260 continues to be stepped until the count of 15 is there registered, at which time the reset network 266 recognizes the count in its gate 304 (FIG. 10) to generate a reset pulse on the line 268. The word counter 260 is then reset and the group counter 262 stepped, and the STN–T line from the decoder 270 is then enabled. The station gates 272 are maintained open to pass the same station identity data, and the word counter 260 is stepped successively and synchronously with the passage of words on the drum until coincidence is again detected, and the Read signal generated as described above.

Upon completion of the STN–T read operation, the group counter 262 is stepped to the next count to provide an enabling signal on the Department line from the decoder 270. The latter enabling signal opens the department gates 274 to supply the department identity data to the program comparator for comparison with the words established in the word counter 260. The operation is similar to that described above, and when identity is detected between the word counter count and the department identity data, a Read signal is again generated that lasts for a word duration to read out the required department data.

The reset network 266, upon completion of the word counter count for the number of departments, resets that word counter 260 and steps the group counter 262. The enabled Clerk line from the decoder 270 opens the clerk gates 276 to pass the clerk identity data into the program comparator and repeat the process described.

After the clerk read-out operation is completed, the Drawer output of the decoder 270 is enabled. Consequently, the drawer gate 271 is opened, and, via gate 275, the station gates 274 are also opened. Thus, the drawer identity data supplied to the comparator combines the single drawer bit with the four station bits. The drawer section of each drum channel is arranged automatically to correspond to the word counter sequence for proper storage and read-out.

After the drawer read-out process, successively the Store-Totals–A, –B, and –C lines are enabled for a single word count each, and the process repeated.

Thereby, a word of each group section of the drum is processed during the drum revolution, and the proper portion of a group is addressed by means of a comparison of the word count with the corresponding identity data. Thus, the outputs of the group-address decoder control the sampling of the associated groups of the message identity data; the STN–NT and –T control signals sample the station identity data, the Department control signal samples the department identity data, and so on. The word counter together with the comparator locates the proper word within the group in accordance with the identity data, and the Read signal is generated so that the located word is properly processed by control signals in the appropriate Adder or Counter.

The monitor station keyboard (not shown) may be similar to the keyboard shown in FIG. 3 with certain modifications. That is, the monitor station keyboard does not include columns of amount keys since the entry of data in the storage is not part of the monitor function. It does include columns of department keys and clerk keys in a manner similar to that shown in FIG. 3.

In addition, the monitor keyboard has a column of three keys for monitoring the Store-Totals sections in each channel of the drum; these keys have respectively three output lines Mon-Totals–A, –B, and –C. These Mon-Totals lines are shown in FIG. 9 connected to the gates 286.

The monitor station keyboard also has a column of station identity keys which identify the station number to be monitored. There are four station identity lines from these keys which establish in binary coded form the station number. These station identity lines are connected to the Input Selector where they are buffed by OR gates 202 with the corresponding station identity lines 215 from the Sequencer. Thereby, when the sequence counter output is all binary 0's (which establishes the STN–16 (Monitor) Gating signal), the station identity data established on the monitor keyboard is passed to the station gates 272 via OR gates 202 without being affected by the 0's on lines 215. For any other sequence counter output, the STN–16 input gates 200 of the Input Selector are closed, and the sequence counter output on lines 215 is supplied to the station gates 272.

The monitor keyboard also has two keys for taxable (T) and non-taxable (NT) read-out of the corresponding two station sections on the drum in channels–1 and –2 (and the station counts of sales and refunds in channel–3). Thus, for read-out of station data, the monitor operator selects a station number as well as the taxable or non-taxable section of the station data. The corresponding two control lines from the taxable and non-taxable keys are identified in FIG. 9 as Mon-T and and Mon-NT, respectively.

The monitor keyboard also has two keys for drawer identification in a manner similar to that shown in FIG. 3. In addition to a drawer identity line from those two keys, which is connected via the input selector to the drawer gate 271, a control line Mon-DR is connected via the Input Selector to that line shown in FIG. 9. Thus, to select the drawer section of the drum, the monitor operator selects the station number as well as the drawer number. When the drawer read-out is selected by the monitor operator, the drawer identity data and station identity data are supplied to the drawer gate 271 and station gates 272 in a manner similar to that described above. In addition, these gates are enabled when the group counter is stepped to enable the Drawer output line of decoder 270. That is, the station gates are enabled via gate 275 under those circumstances. However, the station gates 272 are not enabled when the group counter steps to supply enabling signals on the STN–NT and STN–T lines because gates 271 and 273 are both inhibited by the Mon-DR control signal supplied with the drawer read-out request.

In a similar fashion, when station read-out for the taxable section is selected by the monitor keyboard, the station gates 272 are enabled only when the line STN–T receives an enabling signal which is passed by the gate 271. The enabling signals supplied by the group decoder 270 to the STN–NT and Drawer output lines are not passed by the gates 273 and 275 under those circumstances because of the inhibiting control signal supplied by Mon-T with the aforementioned request. In a similar fashion, the request of Mon-NT together with the station identity from the monitor keyboard permits the opening of the station gates 272 only when the line STN–NT receives an enabling signal via the group decoder 270.

Figure 12:
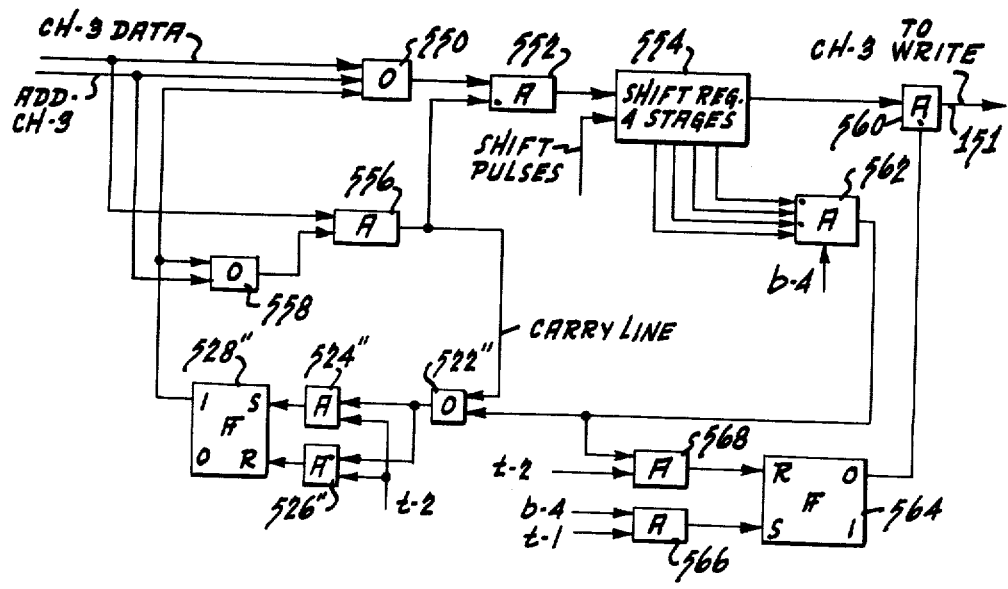
FIG. 12 is a schematic logic and block diagram of another Serial Adder of FIG. 4.

The monitor keyboard also has three action buttons respectively labelled Sales, Refunds, and Activity Counts, corresponding respectively to channels–1, –2, and –3 on the drum (FIG. 5), and separate control lines therefrom are Print-CH–1, –2, and –3 (FIG. 12). In operation, one of the action buttons is pushed together with the selection of the particular group data to be read out. Thereby, the monitor operator selects a particular channel to be read out and a particular group data or category to be read out from the channel. When channel–3 is selected with either NT or T selection, the read-out is of the activity counts of sales or refunds, respectively. Channel–3 selection with department number causes both item A and B counts to be read out as a single word. When the Mon-Totals-C selection is made together with channel–3, the drum read-out is the Store total count of transactions. However, when this Mon-Totals-C selection is made together with the Sales or Refunds action button selection, there is no read-out for the embodiment illustrated in FIG. 5 because no information is stored at those word locations.

The Serial Adders for channels–1 and –2 are the same, and each has two sections to it, as shown in FIG. 11. One is the binary addition section 500 and the other, the decimal carry section 502. In the binary section, the logic includes an OR gate 504 that receives the data read from the drum (the CH–1 adder is illustrated in FIG. 11 by way of example) together with the new input data supplied by the station via the Input Selector gates 198. Gate 506 passes the new data on line 199 to OR 504 under control of an Add-CH–1 control signal. This data is all supplied serially starting with the least significant bit of the least significant digit. Also supplied to OR 504 is the previous carry bit. The output of OR 504 is passed by a sum AND gate 508 (which is inhibited if there is a carry) and by an OR 510 to the input of 4-stage shift register 512. The carry is recognized by three two-input AND gates 514, 516, 518 which respectively receive the three combinations taken two at a time of the bits of the drum data, station data, and previous carry to determine if there is a carry. If any of the gates 514, 516, 518 is enabled by its two inputs, a carry bit signal is generated via OR 520, and the AND gate 508 developing the sum bit is inhibited.

The carry bit from OR 520 is recirculated by way of OR 522 to enable and inhibit respectively two AND gates 524, 526 (both of which are gated by t–2) which respectively set and reset a flip-flop 528. The 1-output of FF–528 supplies the previous carry bit to OR 504 and to the three AND gates 514, 516, 518. In addition, a fourth AND gate 530 receives all three inputs and supplies a binary sum output bit to OR 510 if all three bits are present.

The binary sum shift register accepts binary sum signals under control of t–1, which functions as the shift pulse therefor. The recirculation of the carry at t–2 via FF–528 does not affect the sum registered in shift register 512 at t–1.

If the sum established at b–4, the fourth binary bit, is 16 or greater, an overflow carry is developed from OR 520 that is effective as a decimal carry in the first bit of the next decimal carry. If the sum at b–4 is 10–15, an AND gate, which receives the corresponding bits from register 512 together with b–4, develops a carry pulse that is also effective via OR 520 as a decimal carry for the next decimal digit.

The decimal section 502 of the adder includes an AND gate 532 which receives the carry line from OR 520 together with b–4 and t–1, and its output sets a flip-flop 534 to indicate that a decimal carry is established. A second AND gate 536 receives the output of gate 530 with *t*–2, and its output also sets FF–534 to the same effect. The actual decimal carry is handled in the binary portion of the adder as described above since it is effectively a binary carry in the least significant bit of the least significant next digit. However, the 4-bit binary digit coming from register 512 must be effectively corrected back to binary-coded-decimal form. This situation is handled by the addition of binary 6 to the binary number coming out of register 512.

The setting of the carry flip-flop 534 results in its 1-output enabling an AND gate 536 which also receives *b*–2 and *t*–1 pulses to set a flip-flop 538. The latter remains set during the *b*–1 and *b*–2 pulse times and is reset by the output of an AND gate 540, which receives the *b*–3 and *t*–1 pulses. FF–534 is reset by *b*–2.

The shift register 512 includes four flip-flop stages connected in cascade with the input of each stage gated by *t*–1. Thus, the first bit appears at the output of the last stage of the register at *b*–4, the second bit at the next *b*–1, and the third bit at the next *b*–2. Consequently, with FF–538 set during *b*–1 and *b*–2, its 1-output effectively supplies a binary-6 to be added to the binary output from register 512.

A second three-input binary adder portion 542 receives as its inputs the outputs of the last stage of the shift register 512 and the 1-output of the add-6 flip-flop 538 to develop the binary-coded-decimal sum. This second binary adder portion is the same as the other, functions in the same fashion except that the timing is at a different phase. In the binary section 500 of the adder, the information comes in at *t*–0 time, the sum is registered at *t*–1 in register 512, and the previous carry is recirculated at *t*–2 time (due to the fact that the development of this carry via the shift register cannot be prior to *t*–1 time); while in the decimal section 502 of the adder, the information into the binary adder is at *t*–1 time, and the recirculation of the carry is then controlled to be at *t*–0 time. The operation and construction is otherwise the same (corresponding parts are referenced by the same numerals with the addition of a prime (')) except that any decimal carry developed by this section must be inhibited. The inhibiting action is performed by *b*–4 passed via OR 542 (buffed with the output of gate 526') to reset the recirculation carry flip-flop 528', and thereby prevent the next decimal digit which starts at *b*–4 from receiving any overflow decimal carry at that time.

The output 150 of the final OR gate 510' of the decimal section of the serial adder is used as the output of the adder and goes to the CH–1 write amplifier via gate 154 (FIG. 4) where it is written on the drum at *t*–2 time. (The output line 150 also goes to the Output Selector.) Thus, there is a uniform time delay in the serial adder corresponding to the shift time of the register 512. Any time losses in the logic itself are actually merely tolerance times since the writing on the drum is precisely at *t*–2 4-bit times after having been read uniformly for all of the channels. If there is no station data supplied on line 199, the addition process is nevertheless performed as though all zeroes were being added. Accordingly, the information that is read is recirculated without modification via shift register 512 and OR 504, 510, 504', 510', and AND 508, 508' and written back on the drum and sent to the Output Selector.

The CH–3 adder functions to add one to the previous count, like a counter, a suitable form of which is shown in FIG. 12. The input to the counter is the channel-3 data from the drum, the least significant digit first, which is supplied to an OR 550 together with the Add–CH–3 signal. The output thereof is supplied to an AND gate 552, the output of which, in turn, is supplied to the first stage of a 4-stage flip-flop shift register 554. The data from the drum is also supplied to another AND gate 556, and the Add–CH–3 signal is supplied to that AND gate via an OR 558. The output of AND gate 556 is the carry signal which is used to inhibit the first AND gate 552 when both the number from the drum and the ADD–CH–3 signal are present. The carry signal is recirculated to the input OR 550 and 558 via a network similar to that described above for the adder (and corresponding parts are referenced by the same numerals with the addition of a double prime ('')).

The ADD–CH–3 signal is only present during *b*–1 (as is shown below) for the least significant bit of the least significant digit. The carry signal is, of course, not present during that least significant bit, but may be present at any bit of any digit thereafter. Thereby, the carry signal and the ADD–1 signal are never present concurrently. The output of the shift register 554 from the last stage thereof is passed via AND gate 560 to the CH–3 gate 158 (FIG. 4) for writing back on the drum. In addition, the states of the register flip-flops are examined for purposes of detecting a decimal carry; which detection is in another AND gate 562 which receives a sampling pulse at *b*–4 of each of the digits. If the shift register registers a decimal 10, a pulse from the AND gate 562 sets up a carry via the same path as the previously mentioned carry. This digit carry is sampled in the same way at *t*–2.

The gating to the drum storage is controlled by a flip-flop 564, the 0-output of which is used to inhibit the gate under certain circumstances, and otherwise to enable it. FF–564 is set by the output of a gate 566 which receives the *b*–4 sampling pulse together with *t*–1 and is reset via gate 568, which receives the digit carry signal sampled at *t*–2. Thus, if there is a digit carry, the output on line 151 is all zeroes because the output gate 560 is inhibited and remains inhibited for four bit times until FF–564 is set again by the following *b*–4. When a decimal carry is established via gate 562, a 0-bit is registered in the last shift register stage; accordingly, it does not affect the output of the sampling gate.

The recirculation of the CH–3 information is in the same phase relation as that via the serial adder of FIG. 11. The information signals in all three channels are read from the drum at *t*–0 and, therefore, are synchronous with the timing track on the drum. The write amplifiers of all the channels are enabled by *t*–2 pulses so that the outputs of the three serial adders are only sampled at that time. Thus, the information storage system incorporates recirculation delay lines, each of which includes a drum channel and a serial adder. That is, the information is read from the drum continuously and recirculated to write amplifiers for re-recording. In the case of the Sync track 144, the signals are recirculated via delay 143 (which is preferably a 4-stage shift register of the same type as in the serial adders with the shift pulses being *t*–1) and rewritten on the drum under the control of *t*–2 pulses. In a similar fashion, a recirculating shift register of the same type is provided for the timing track delay 141. Thus, all of the drum channels or tracks have their signals recirculated synchronously; any modification of the CH–1 to –3 information signals does not affect the phase relations in which they are written back on the drum. Since the signals in all of the channels or tracks are written synchronously by *t*–2, the phase relations are maintained for synchronous read-out on the next drum cycle. This recirculation of information signals via the adders makes the information continuously available for updating as required by the cash-drawer station operations and for monitoring by the monitor station with relatively simple and reliable apparatus.

Figure 14:
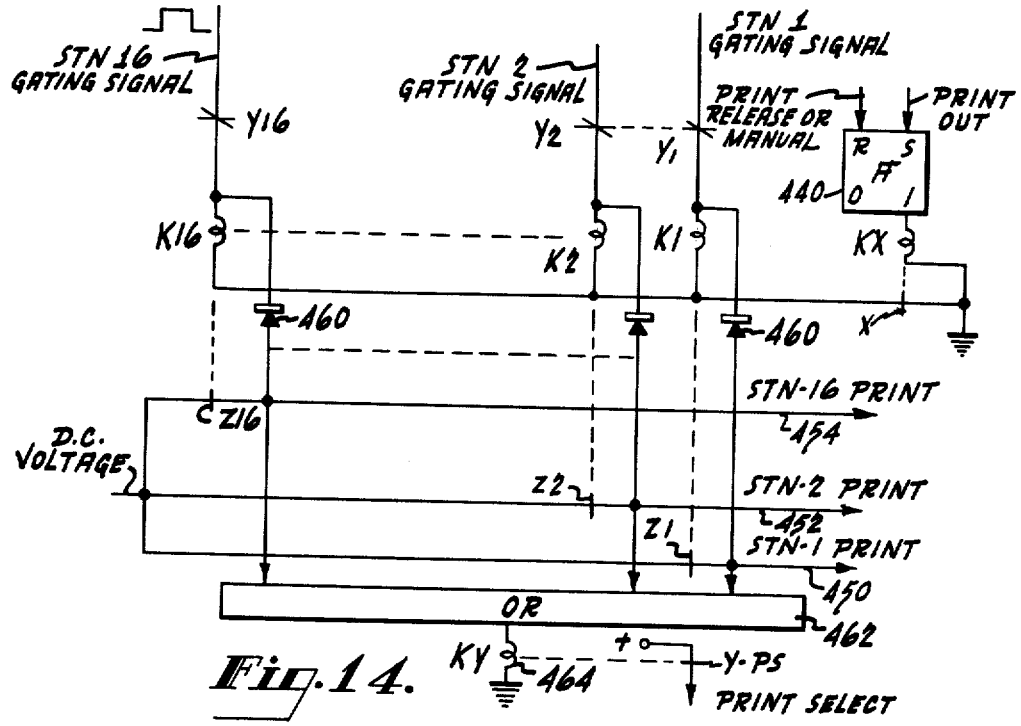
FIG. 14 is a schematic circuit and block diagram of another portion of the Output Selector of FIG. 4.

In FIGS. 13 and 14 the control of the Output Selector 158 is illustrated. In FIG. 13 an AND gate 400 receives the output signals from the counter for channel-3 together with the Print-Counter signal; an AND gate 401 receives the Adder–1 output signals together with the Print-Adder-1 signal, and an AND gate 402 receives the Adder–2 outputs with Print-Adder-1. The information is received serially as it is stored on the drum with the least significant bit of the least significant digit coming first.

The outputs of gates 400–402 are passed via an OR gate 404 to a set of four AND gates 406–412 which are respectively enabled by the $b$–4 signal of one digit and the $b$–1 to –3 signals of the succeeding digit, all from the Timing Generator, and are gated by $t$–2 (the signals having been set up at $t$–1 of $b$–4 at the adder output). The outputs of the gates 406–412 are respectively connected as inputs to a first set of four gates 413 that also receive as gating signals the digit signals from the Timing Generator, the first gate receiving $d$–0 and the others receiving $d$–1. The outputs of the gates 413 are respectively connected to the set inputs of four flip-flops 414, 416, 418, and 420. The Clear signal line is connected to the reset inputs of FF–414 to –420.

The signals stored in these flip-flops in binary-coded-decimal form represent the least significant digit of the output passed from Adder–1, Adder–2, or the CH–3 counter. The signals in the lines 422 at the 1-outputs of these flip-flops, which together form a register stage 424, represent this least significant digit also, and these lines 422 are connected by cables back to a set of gates at each station.

In a similar fashion, the outputs of gates 406–412 are connected to six other flip-flop register stages, only the last 426 of which is shown. The 1-output lines 430 of this register stage 426 represent in binary-coded-decimal form the seventh or most significant digit of the output. In practice, in the illustrated embodiment, only the four least significant decimal digits are needed for transaction totals, and these digits are returned to the transaction consoles; and all seven digits (which are needed for some of the overall totals) are supplied to the monitoring console.

The output lines 422 of the four flip-flop register stages 424 containing the five least significant digits are also individually connected to AND gates 432 that are enabled by TT which initiates the tax computation operation. The outputs of gates 432 are collected in a cable 166 that is connected back to the Input Selector (FIG. 6).

Figure 16:
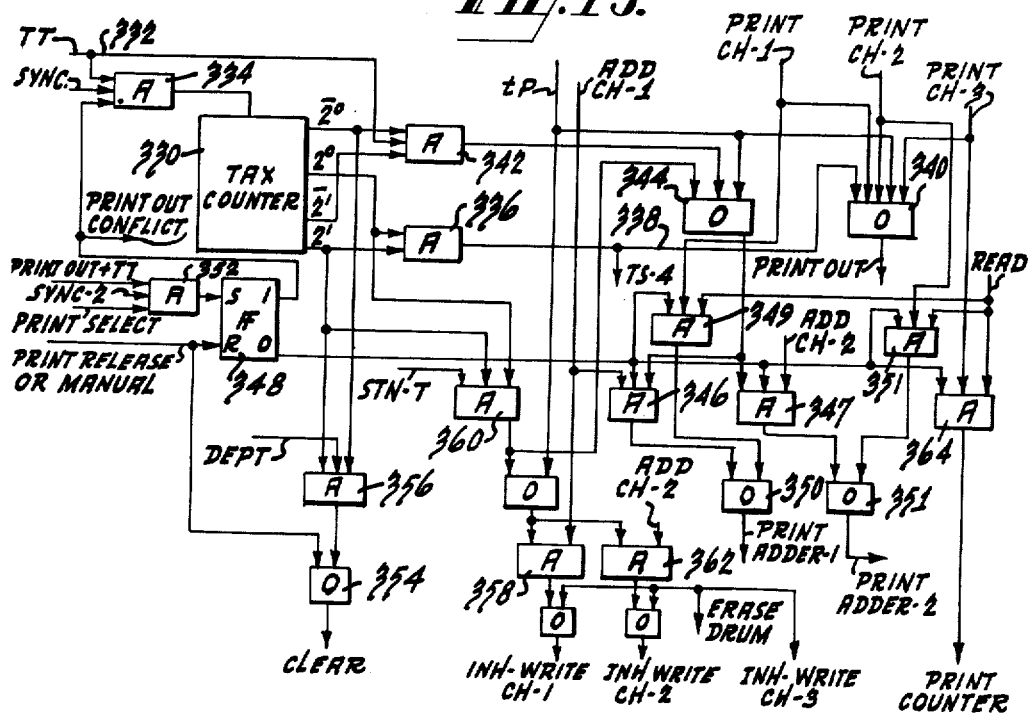
FIG. 16 is a schematic logic and block diagram of another portion of the Program Control of FIG. 4.

In operation, either the Adder–1 or –2 output signals or the CH–3 counter output signals are passed by gate 401, 402, or 400 depending upon whether the Print-Adder–1 or –2 or Print-Counter signal is developed in the Program Control (FIG. 16). The serial train of signals is fed to the gates 406–412 which are gated by $t$–2 and respectively successively sampled by the $b$–4, –1, –2, –3 timing signals. The outputs of gates 406–412 are respectively supplied to the gates 413 together with the appropriate $d$–0 or $d$–1 signals to distribute the four bits of the least significant digit to register stage 424. In a similar fashion, the other output digits are successively passed by the $d$–1 to –7 signals to register them in the other register stages including the seventh digit register stage 426. The registered signals are then available for utilization by the proper station or for feedback by the tax totalling operation (signal TT) to the Input Selector.

In FIG. 14, a switching network is shown for developing the Print-Select signal of that station which is coupled to the Program Control so that only that coupled station prints the signals which have been developed on the digit lines 422, 430. A flip-flop 440 is set by the Print-Out signal and reset by the Print-Release or Manual Reset signals. The 1-output of FF–440 energizes the coil of a KX-relay which is returned to ground. The STN-Gating signal lines are connected via normally closed Y switches Y–1 to –16 to the coils K–1 to –16 of KZ relays which are returned to ground via the normally-closed switch X of the KX relay.

When one of the STN-Gating signals is supplied, the associated K–1 to –16 relay is energized to close the associated Z–1 to –16 normally-open switch. The closing of the latter switch passes a D.-C. voltage to the associated one of the output lines 450, 452, or 454 which represents the STN-Print lines that are connected to the associated stations as shown in FIG. 2. The STN-Print signal of each station opens the associated gates 68 to pass the output data on lines 422 to the Printer 64 and Display 66 of that station. Thereby, the station which is connected by the Sequencer 104 to the Program Control 110 as indicated by the STN-Gating signal, has a corresponding STN-Print signal developed in response to the setting of Print-Out FF–440 for totalling operations so that print-out and display of the totals are effected.

In addition, a separate diode 460 is connected from the junction of each of the Y–1 to –16 switches and associated KZ relay coil to the associated STN-Print line 450–454. The STN-Print lines are connected via an OR gate 462 to energize a KY relay coil 464 which is returned to ground. The KY relay coil is energized when a STN-Print line receives the D.-C. voltage, and it opens the Y–1 to –16 switches. Thus, when a STN-Print signal is developed on one of the lines 450–454, the D.-C. voltage on that line is passed by the associated diode 460 to energize the associated KZ relay coil through a return path to ground. In addition, the D.-C. voltage is passed via the buffer 462 to energize the KY relay coil and open all of the Y–1 to –16 switches. However, the STN-Print signal is maintained due to the latching of the energized KZ relay coil via the diode 460 to maintain the associated Z switch closed, and thereby the STN-Print signal is also maintained. The diodes 460 decouple the STN-Gating lines from the buffer 462.

As a result of this arrangement, the STN-Gating signals are decoupled from the print-out operation since the STN-Print signal continues once started by the STN-Gating signal and the setting of FF–440 by the Print-Out signal. Thereby, the next station message may be processed while the print-out operation is performed at the preceding station, and all of these operations are essentially independent.

The KY relay, when energized, also closes a Y–PS switch which passes a suitable D.-C. voltage to the Print-Select line. The latter is used to indicate that a print-out operation is in process. Thereby, a Print-Out Conflict can be detected as described in connection with FIG. 16.

As noted above, the station control panel 60 (FIG. 2) supplies its outputs to the printer 64 and display 66 by sending the amount data through OR 62 to the printer and display, and its identity data such as the department identification directly to the printer via lines 65. The Output Selector sends the output information back to the proper station via the STN-gates 68 under the control of the STN-Print signal. The printer provides a control panel release signal on line 68 some plurality of drum revolutions later (due to the relatively slow operating time thereof) which releases the control panel keyboard and also supplies the Print-Release signal back to the Output Selector via associated AND gate 470 enabled by the associated STN-Print signal. The control panel release does not occur for some time after the keyboard entry of the information so that the control panel remains locked for one or more drum revolutions.

The display and printing of control panel information are under the control of the associated STN-Gating signals. That is, the display device is reset and cleared by its station gating signal end enabled to receive and handle the next set of data signals to be displayed. Similarly, the printing operation is initiated by the STN-Gating signal. The STN-Gating signal is supplied to the printer and display device by way of a gate 472. The gate 472 is enabled by a signal from the Program Control on line 474 which indicates that the drum revolution is substantially completed. For example, this signal may be derived from the group decoder 270 (FIG. 9) with the Store-Totals-C signal being gated with the last digit signal ($d'$–7) from the decoder 250 of the Timing Generator (FIG. 17). Thereby, the STN-Gating signal is passed by gate 472 to actuate the printer and display when the print-out operation, if there is to be one, is in process.

Accordingly, if there is a print-out operation, the STN-Print signal is then available as is the output data for printing and display. If this is merely an item-entry operation, and the station supplied data is to be printed and displayed, the initiation of the printing and display also takes place at this time. Therefore, there is no ambiguity as to which data is to be printed; whichever data (output or station-supplied) that is available at print-out time is printed. Consequently, spurious characters such as zeroes or other transients that might be established at the OR gate 62 or on the output data lines 442 at other than the print-out time are not printed or displayed.

An additional input line 476 is an inhibit input to the gate 472. This line 476 blocks the passage of the STN-Gating signal through gate 472 if a tax computation is being performed. The signal on line 476 is derived from the Program Control (FIG. 16) by obtaining from the tax counter 330 signals corresponding to the first three tax steps and supplying those signals to line 476 through a buffer. Thereby, during the performance of tax operations, gate 472 is inhibited by the first three tax steps; and it is enabled to pass the station gating signal only after the fourth tax step is completed and when the print-out operation is initiated.

The relative timing of the print-out operation can be appreciated by considering the relative operating times of available devices. For example, a drum speed may be of the order of 1800 r.p.m. so that a drum revolution is about 35 milliseconds. (This provides a 100 k.c. pulse rate for a bit storage of about 3000–4000 bits per channel.) The printer operating speed may be of the order of $\frac{1}{10}$ of a second or less, and the display operating speed may be very much less. Accordingly, the printing operation is performed in the order of time of two drum revolutions or less. Assuming a sequencing cycle for 16 stations, with a drum revolution for each station, the entire sequence cycle is about one-half second. Accordingly, the printing operation is performed in a fraction of the entire sequencing cycle and does not interfere with the normal operation of the clerk station.

Figure 15:
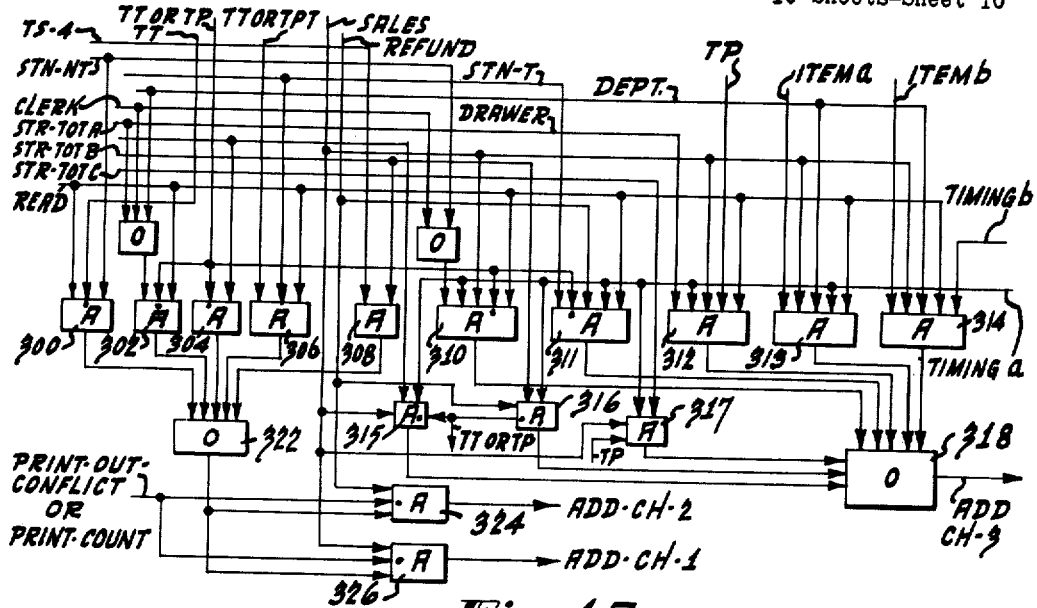
FIG. 15 is a schematic logic and block diagram of another portion of the Program Control of FIG. 4.

In FIG. 15 of the Program Control unit, the generation of various control signals for operating the adders is outlined. Inputs for the generation of these control signals include the outputs of the group decoder 270. In addition, the control signals such as Sales, Refund, and the action-button signals generated by the keyboards of the clerk stations are also utilized.

A set of AND gates are used for combining these signals to generate the control signals Add-CH-1, Add-CH-2, and Add-CH-3. For example, gates 300, 302, 304, 306, and 308 generate a pulse in response to certain combinations of control signals, and their outputs are supplied via OR gate 322 to two AND gates 324 and 326, which respectively generate Add-CH-1 and Add-CH-2. The other inputs to the AND gate 324 are the Refund signal together with an inhibit signal developed by either the Print-Out Conflict or Print-Count signals. Gate 326 generates Add-CH-1 in response to the Sales signal, and it is inhibited by either the Print-Out Conflict or the Print-Count signals. Thus, a Sales entry generates Add-CH-1, and a Refund entry generates Add-CH-2.

Consistent with the data stored in channel-1, it is seen from FIG. 15 that this Add-CH-1 and -2 signals are generated by the corresponding set of control signals that are combinatorially present. Thus, gate 300 generates its pulse in response to the Read signal, the STN-NT signal, and is inhibited by the TT signal. Gate 302 generates its pulse in response to any one of the Department, Clerk, or Drawer signals together with the Read signal and its inhibited by either of the TT or TP signals. Gate 304 generates its pulse in response to Store-Totals-A and in the absence of either TT or TP. Gate 306 generates its pulse in response to either TT or IPT, and STN-T and Read. Gate 308 is response to TS-4 and Store-Totals-B.

The Add-CH-3 signal is generated by each of the AND gates 310–317, the outputs of which are passed by OR gate 318. The following signal combinations are supplied to these gates 310–317. Gate 310 is enabled by Timing-a, Read, Sales and either the STN-NT or the Clerk signal, and is inhibited by either TT or TP; gate 311 is enabled by STN-T, Read, Refund and the Timing-a signal, and is inhibited by TT or TP; gate 312 is enabled by the Timing-a signal, Read, Sales, TP, and the Drawer signal; gate 313 is enabled by the Timing-a signal, Read, Sales, the Department signal, and the Item a signal; gate 314 is enabled by the Timing-b signal, the Item-b signal, Read, Sales, and the Department signal; gate 315 is enabled by Sales, Store-Totals-A, and Timing-a and is inhibited by TT or TP; gate 316 is enabled by Refunds, Store-Totals-B, and Timing-a and is inhibited by TT or TP; and gate 317 is enabled by Sale, Store-Totals-C and Timing-a, and TP.

In FIG. 16 the generation of additional control signals is illustrated. A 2-stage binary counter 330 is used to control the tax operation. The tax counter is stepped by the Sync signals via AND gate 334, which is enabled by the Total Tax (TT) signal on line 332. An AND gate 336 receives the tax counter outputs for a binary count of 3 and generates TS-4 on line 338 to indicate that the fourth cycle of the tax operation is being performed. The signal on line 338 is also passed by OR gate 340 as the Print-Out signal. When the tax counter 330 registers a count of zero, the AND gate 342 is enabled to pass the total tax signal (TT) on line 332 via buffer 344 to AND gates 346 and 347. The gate 346 is enabled in addition by Add-CH-1 together with the 0-output of a flip-flop 348 to produce the Print-Adder-1 signal on line 350. Gate 347 is enabled in addition by Add-CH-2 and the 0-output FF-348 to produce Print-Adder-2 on line 351. Gates 346 and 347 are alternatively enabled by TP passed by buffer 344.

Print-Adder-1 is also generated via gate 349 which combines Print-CH-1, Read, and the 0-output of FF-348. Print-Adder-2 is also generated by gate 351 which combines Print-CH-2, Read, and the 0-output of FF-348.

FF-348 is reset by the Print-Release or by the manual reset signal. FF-348 is set by the combination of Sync-d, Print-Out or TT, and the Print-Select signal, all of which are gated in gate 352 and supplied to the set input of FF-348. The 1-output of FF-348 is the Print-Out Conflict signal which is used to inhibit the gate 334 to prevent the counting operation in counter 330 (and to inhibit the generation of Add-CH-1 and -2, FIG. 15). Thus, the gate 352 is used to recognize the conflict that is developed when the Print-Select signal is generated at the same time as either the Print-Out or TT signals.

The Print-Release and Manual Reset signal are supplied to OR gate 354 to generate a Clear signal used in the Output Selector. The Clear signal is also generated via AND gate 356 which receives the Department signal together with the signal combination from counter 330 representing tax step-2.

The signal Inhibit-Write-Channel-1 is generated in gate 358 by the combination of Add-CH-1 and either the Total Price (TP) signal or the combination via gate 360 of STN-T and the counter outputs for TS-4. The output of gate 360 is also supplied via buffer 344 to gates 346 and 347 to generate the Print-Adder-1 and -2 signals.

The INH-Write-CH-2 signal is generated in gate 362 by the Add-CH-2 signal together with the other signal combinations supplied to gate 358 as noted above. The INH-Write-CH-1, -CH-2, and -CH-3 signals are also directly generated by an Erase Drum signal from a maintenance panel push-button.

The INH-Write-CH-1 and -CH-2 signals are generated in phase with the Add-CH-1 and -2 signals. However, due to recirculation of the information through Adder-1 and -2, information to be rewritten is delayed 4-bit time periods (i.e. a decimal digit). In the system illustrated, only seven of the eight digits in a storage word are utilized, the eighth digit being left blank. Accordingly, the single digit phase displacement of INH-Write is consistent with the eighth digit being left blank. If it is desired to use that eighth digit of word storage, the INH-Write signals are delayed by 4-bit time periods to rectify the phase relationships.

The Print-Out signal is also generated via buffer 340 by TP, or Print-CH-1, -CH-2, or -CH-3 signals. The latter are the signals generated on associated lines of the monitor keyboard by the action buttons thereof which respectively ask for monitoring information on Sales, Refunds, and Activity Counts. The Print-CH-3 signal is also supplied to gate 364 together with the Read signal and the 0-output of FF-348 to develop the Print-Counter signal.

Overall operation

Initially, an Erase-Drum signal is provided by a maintenance panel to erase the drum at the start of a day's operation; this signal develops the INH-Write-CH-1, -2, and -3 so that no information is written back on the drum after the usual erasure.

The operator at each one of the cash drawer stations sets up the drawer number and clerk number assigned to him and is then ready to handle the first customer. The first item of a customer transaction is set up by the proper keys being depressed; that is, the keys for the price, the department from which the first item is derived, and for Item A or B of the selected department if it is one of those to be inventoried, and the type of transaction (for example, a Sale), and finally an action button (for example, the Item Price and Taxable button, assuming the first item is taxable).

When the Sequencer counter 210 (FIG. 7) steps to the first station count, the STN-1 Gating signal is developed. Thereby, the STN-1 input gates 180 of the Input Selector (FIG. 6) are opened to pass the identity and amount data through its distribution and gating network.

The station identity signals from the Input Selector are supplied to the Program Control gates 271, 272, 274, 276 (FIG. 9) together with the station identity data derived from the Sequencer counter. The Sync pulse which establishes the STN-1 Gating signal also resets the word counter 260 to a count of 1, and the group counter 262 to a count of 0. Thereby, the STN-NT signal is available to open the station gates 272 to pass the station identity data into the program comparator. Since the word counter 260 is reset at a count of 1 at that time, a coincidence with the station identity data is achieved in the program comparator 264 to develop the Read signal from buffer 284. The Read signal in the Program Control (FIG. 15) is effective with the STN-NT signal in gate 302 and the Sales signal in gate 326 to develop the Add-CH-1 signal. This Add-CH-1 signal enables the input gate 506 at the CH-1 Adder (FIG. 11) to pass the station data from the Input Selector into that adder. The output of Adder-1 recirculates to the write amplifier of channel-1 via the AND gate 154, which is enabled since the INH-Write-CH-1 signal is not developed at this time. Thereby, the first item price is entered in the appropriate storage position of channel-1 which accumulates the transaction price.

At the same time, the Add-CH-3 signal is developed via gate 310 (FIG. 15) and is effective to add 1 to the 0-count of the word of channel-3 for the STN-1 count of Sales. The Add-CH-2 signal is not generated since the transaction is not a refund and the channel-2 information recirculates unchanged.

The word counter 260 is ultimately reset by the network 266 (FIG. 10) and the group counter is stepped to develop STN-T. Since the word counter is again a count of 1, the comparator generates the Read signal again, and the same process is repeated to store the item price which is taxable in the corresponding station location in channel-1.

Again upon the stepping of the group address counter 262 to enable the Department line, the department gates 274 are opened to pass the department identity into the Program Comparator 264 for comparison with the word counter. When the word count is stepped to equal the department identity number established on the keyboard, the Read signal is developed as described above. The Add-CH-1 signal again is developed in the Program Control (FIG. 15). The item price is then stored in the proper department location in channel-1. The Add-CH-2 signal is not developed at this time, but the Add-CH-3 signal is developed if either the Item A or B buttons were depressed. If Item A is depressed, the Add-CH-3 is generated by the Timing-a pulse via gate 313, and if Item B is depressed, by Timing-b via gate 314. Thus, a count of 1 is established in the first half of the drum word section for the associated department if an Item A, and in the second half if an Item B. The Timing-a and -b pulses are effectively used to provide a breakdown in the word count into two halves, the first occurring at d-0 and the second at d-4.

In a similar fashion, when the Clerk and Drawer lines are enabled by the group counter 262, the item price is also stored in the proper clerk location in channel-1 and in the proper channel-1 drawer location for that station. Also, a clerk count of 1 is established in the proper location in channel-3.

When the Store-Totals-A signal is developed by the group counter 262, the Add-CH-1 signal is again generated, and the item price is stored in the proper drum address in channel-1. Concurrently, the Add-CH-3 signal is generated, and the count of 1 is established in the Store Total Count of Item Sales section of the drum. However, when the group address counter 262 steps to enable Store-Totals-B and -C, none of the Add-Channel signals are generated since none of the Store-Total-B and -C words are updated for the particular operations of Sales and Item Price Taxable that were initiated by the station operator.

In a similar fashion, each of the other stations in sequence enters its first item price if ready to do so. Upon completion of the first sequence cycle, station-1 enters its second item price which is added cumulatively to the preceding entries, and the activity counts are also appropriately updated. This process with each station in turn being coupled to the transaction central for an appropriate entry if ready, is repeatedly performed. Upon return of the sequence to the first station, the second item is entered in a similar fashion, and the sequence cycle is again repeated, and so on.

The operation is similar with the refund button being depressed instead of sales, but in this case the operations are performed in channel-2 with Adder-2. Also under the latter circumstances, only the refund portions of channel-3 (those corresponding to group address signals STN-NT and Store-Totals-B) have a count of 1 added therein. The refund operations may be interspersed with the sales operations.

Where the Item Price button is pushed by the station operator, the operation is generally the same, except that tax portions of the channels are not affected by the operation since only the IP signal is available.

When the Total Price button is depressed by the operator to develop the TP signal, the drawer and clerk identity signals are established at the input of the program comparator 264 together with the station identity signals in the manner described above. The Read signals are generated by the comparator as the drum rotates and the word and group counters step. When the proper station position is established in the word count, the Read signal together with the STN-NT signal develops an Add-CH-1 signal via gate 300 and gate 326 if the Sales button is selected, or Add-CH-2 via gate 324 if Refund is selected. Due to the fact that an interlock on the keyboard prevents the depression of the amount keys at the same time that a total key is depressed, no station amount data is supplied to Adder-1 or -2. Accordingly, the information is merely circulated through these adders and developed at the Output Selector. If the Sales button is selected with the Total Price selection, Add-CH-1 is generated, and in the Program Control (FIG. 16), the TP signal is passed by OR 344 to gate 346 together with Add-CH-1 and the signal representing the absence of a Print-Out Conflict from the 0-output of FF-348 to generate the Print-Adder-1 signal.

The Total Price operation develops the print-out from the STN-NT section of channel-1, in which the prices of all items (both non-taxable and taxable) are cumulatively stored. Thus, this operation obtains the total item prices of the transaction; however, the tax itself is separately obtained as described below.

In the Output Selector (FIG. 13) Print-Adder-1 enables gate 401 to pass the Adder-1 outputs into the bit gates 406-412 and the decimal gates 413 in the manner described above. This establishes the adder outputs in parallel in the flip-flop register stages 424. The print-out operation is also initiated by the TP signal which generates the Print-Out signal via OR 340 (FIG. 16) to set FF-440 (FIG. 14). If station-1 is coupled in, the STN-1-Print is generated, and the output data on lines 422 (FIG. 13) is supplied to the printer and display (FIG. 2) of that station.

While the print-out operation is being performed, the Output Selector is locked out due to the development of the Print-Select signal (FIG. 14) which is applied to AND gate 352 (FIG. 16). That is, if another Print-Out signal should be developed via OR 340 (FIG. 16), the Print-Out Conflict FF-348 is set to prevent the handling of the second print-out operation until the first one is completed. Thus, the machine is stalled momentarily until the first print-out is completed since the Sequencer (FIG. 7) is inhibited from being stepped at this time, and the station calling for the second print-out has its STN-Gating signal inhibited. However, when the first print-out operation is completed, the Print-Release signal resets FF-348 to remove the Conflict signal and permit the next print-out operation to be performed.

The total signal TP also is effective to generate INH-Write-1 or -2 (FIG. 16) via gate 358 or 362 so that the station total transaction price that is read from the Station-NT section of the drum (which includes both taxable and non-taxable items) and printed is not written back. Thereby, the station transaction price storage area for that station is erased at that time so that the items for the next transaction can be entered in due course.

During the remainder of that drum rotation for the operation of Total Price on Sales, no operation is performed with respect to channels-1 and -2. However, since the transaction is now completed, in channel-3 there are only two updating operations, one for the drawer identified at that station to add 1 to its total count of transactions, and the second to add 1 to the store total count of transactions. The Add-CH-3 signal is generated at the proper times for these two updating operations via gates 312 and 317, respectively.

If the Refund button is selected with the Total Price selection, the operation is generally similar to that described for the Sales selection with certain differences. That is, the read-out is from channel-2 to obtain the refund price total for the transaction of the station involved, and there is no updating at all in channel-3.

The Total Tax operation involves a computation on the total price of the taxable items. This tax is assumed to be 3% for illustration, and appropriate modification may be made for any tax percent. When the Total Tax button is depressed by the operator to develop signal TT, gate 306 (FIG. 15) develops the Add-CH-1 signal via gate 326 if Sales, and ADD-CH-2 via gate 324 if Refunds. The information stored at the proper drum location in the CH-1 or CH-2 station storage area for Transaction Taxable is passed through Adders (but without any additional station data being supplied or added thereto). The Total Tax signal TT in the Program Control (FIG. 16) passes gate 342 (at the initial 0-setting of the tax counter 330) to develop the Print-Adder-1 signal, assuming the Sales button is selected, via gate 346. The TT signal also enables gate 334 to pass the next Sync pulse to step counter 330 at the end of each tax step. Print-Adder-1 is used in the Output Selector (FIG. 13) to pass the output of Adder-1 via gate 401 into the output flip-flop register stages 424. At that time, INH-Write-CH-1 is not developed (it is developed via gate 360 at Tax Step-4) so that this information read from the drum is also rewritten thereon. Accordingly, at the completion of Tax Step-1, the taxable price total initially stored on the drum is rewritten there and also set up in the Output Selector register stages 424. Also, the register outputs are passed by gates 432 enabled by TT, back to the Input Selector.

The stepping of counter 330 by the next Sync initiates Tax Step-2. The Add-CH-1 signal is again developed to pass the price information fed back to the Input Selector into Adder-1, together with the same information stored on the drum. Thus, the 16 bits from the drum and the 16 bits from the Output Selector register stages 424 are added together in Adder-1 and the sum of twice the original taxable price total is rewritten on the drum since INH-Write-CH-1 is again not developed. This sum is not passed to the Output Selector since the Print-Adder-1 signal is not developed on Tax Step-2. Moreover, the Output Selector register stages 424 still contain the original price total since the register is not cleared at that time.

On Tax Step-3, the add operation is again repeated in the manner described in order to develop three times the original taxable price total that was stored. This sum is again rewritten on the drum. The tax counter 330 provides an enable signal for AND gate 356 at Tax Step-3 when the Department enable signal is developed, which is immediately after the addition process is completed. The output of gate 356 develops the Clear signal via buffer 354 to reset the register stages 424 in the Output Selector. Thus, upon completion of Tax Step-3, the Output Selector register stages 424 are ready to receive the tax data.

On Tax Step-4, the Add-CH-1 signal is developed in the manner described above; the INH-Write-CH-1 signal is developed by way of gates 360 and 358; and the Print-Adder-1 signal is developed by way of AND gate 360, buffer 344, and gate 346. Accordingly, the information stored on the drum, representing three times the original total taxable price, is passed through Adder-1 to the Output Selector without any additional amount added thereto.

In order to obtain the tax of 3%, the stored sum amount is divided by 100; this is done simply by dropping the two least significant digits of the sum and by retaining the remaining digits, which would be three digits at most. This operation is performed by changing the timing of the decimal digit signals from the Timing Generator (FIG. 8) by means of the switching network 252. A suitable form of network is shown in FIG. 17. This network includes a separate gate 580 for each of the $d$-0 to -7 lines (which gates are all inhibited by TS-4 to block the passage of the pulses to those lines. A second set of gates 582 respectively receive the $d'$-2 to -5 timing pulses and switch them to the $d$-0 to -3 lines, respectively, through appropriate buffer OR gates 584. Consequently, the $d$-0 and $d$-1 timing pulses are inhibited, and instead the $d$-2 timing pulse is effectively switched to the $d$-0 line in the Output Selector; the $d$-3 timing pulse is switched to the $d$-1 line; the $d$-4 pulse to the $d$-2 line; and the $d$-5 pulse is switched to the $d$-3 line. Accordingly, the gates 413 are closed during $d$-0, $d$-1, and part of $d$-2 so that the two least significant digits of the total taxable price are simply dropped, and the remaining three decimal digits representing the 3% tax are inserted in the three least significant register stages 424 of the Output Selector.

The TS-4 signal generated by gate 336 (FIG. 16) on line 338 develops the print-out signal via buffer 340 so that the print-out operation of the tax can be performed in the manner described above in connection with the total price print-out.

Also on Tax Step–4, the gate 308 (FIG. 15) generates ADD-CH–1 when Store-Totals-B is developed. At that time, the tax amount is registered in the Output Selector register stages 424, and the feedback gates 432 are still opened. Accordingly, the ADD-CH–1 signal is effective to add that tax total to any previous total in the Store-Total Sales Tax word on the drum.

In a similar fashion, the total tax on taxable refunds is performed with the data in channel–2. No operation is performed on channel–3 data during any of the total tax operations since the updating of the transaction counts takes place only during the total price operation.

For the purposes of this embodiment of the invention, the total price does not include the total tax as a grand total. Thereby, the operator is able to handle the tax moneys separately from the transaction money. However, by appropriate modification of the program control, a grand total button may be provided to initiate a grand total operation after the tax operation has been performed, and the three-times taxable amount computed and stored back on the drum. This may be done by computing the total tax in the manner described and storing it in the Output Selector register stages. Then this tax amount is added to the total transaction price in Adder–1. The station transaction totals would be stored on the drum until the grand total operation. Appropriate control signals for this operation will be readily apparent from the aforegoing description.

The monitor operation involves the selection of one specific drum storage area at a time by selecting the circumferential address and the channel. The circumferential address is selected by identifying one of the following: clerk; department; station in combination with either Taxable or Non-Taxable; station in combination with drawer number; or Mon–A, –B, or –C. The selection of one of the action buttons for Sales, Refunds, or Activity Counts determines the channel by supplying the Print-CH–1, –2, or –3 signal, respectively. The identity signals of the selection are supplied to the program comparator 264 to develop the Read signal when the desired address on the drum is located. Only one of the drum addresses, however, is read out for each activation of an action button.

The Clerk selection monitors the identified clerk data in the proper drum section and in the selected channel. The Department selection similarly monitors the department data; the monitored department data for Activity Counts includes Items-*a* and -*b* in the form of two spaced 3-digit counts. The Station selection in combination with Non-Taxable monitors in Channel–1 the transaction overall price at the current stage of the transaction, the transaction refund in Channel–2, and the sales count in Channel–3; with Taxable, the monitoring is of the taxable price, the taxable refund, or refund count depending on the channel selected.

If Mon–A is selected together with one of the action buttons, say the Sales, thereby, the Print-CH–1 signal is developed together with the Read signal when the Store-Totals–A signal is developed. The Print-CH–1 signal develops the Print-Adder–1 signal together with the Print-Out signal so that there is a print-out of the Store Total sales price in a manner similar to that described above. This print-out is at the monitor station only. In a similar fashion, selection of Mon–A together with Refunds or Activity Counts generates Print-CH–2 or –CH–3 to print-out the Store Total Tax Refund or Store Total Count of Item Sales. The operation with Mon–B or –C is also similar, and the appropriate section of the drum is read out to the monitor station.

The selection of a station button together with a drawer button selects the proper drawer section of the drum in a manner similar to the selection thereof by a clerk station. That is, the drawer and the station data developed by the drawer and station buttons are supplied to the drawer gate and the station gates via the Input Selector in the manner described above. A program comparator operation is performed to develop a Read signal when the proper portion of the drum is being read out. This, together with the action button (which determines the channel which is being read out) selects the information to be sent through the associated adder to the Output Selector. The print-out operation for STN–16 is performed in the manner described above, for the clerk stations.

As an alternative scheme for more detailed item inventory, an additional channel on the drum is provided for each department, and a full column of item identity keys is furnished on each clerk station keyboard. The channel that is circulated through a special counter is determined by the department identity data. The item that is updated by a count of 1 is determined by the item identity data that is supplied to an inventory program comparator with the output of an inventory address counter in a manner similar to the word address counter arrangement in FIG. 9. Thereby, a complete inventory for each department is performed with the updating of the items for each department taking place concurrently with the operations for channels–1 to –3. For this purpose, a separate single inventory update counter (in addition to the one for channel–3) operates only with the department channels. The information in the selected department is switched for recirculation through the inventory counter; all the other channels are recirculated through individual 4-stage shift registers. Appropriate controls are provided to monitor these inventory channels, and these include additional monitoring signals. For monitoring, the inventory program comparator and word address counter arrangement is used, with the department signals selecting the channel to be monitored, and a set of a full range of item identity signals locating the proper section of the channel via the inventory program comparator. The read-out of the inventory channels to the Output Selector is via an additional input gate controlled by an inventory channel signal from the monitor in a manner similar to the monitoring of the Activity Counts of channel–3. The inventory counter may be a step-down counter, or subtractor to obtain net inventory counts.

The logic elements such as the AND, OR gates may be of any desired form. Suitable circuits therefor and for the flip-flops, the flip-flop shift registers, counters, and decoders are well known in the art. The logic has been illustrated in a functional fashion; any suitable form of logic, such as NOR gate logic, may also be utilized and appropriate designs are well within the skill of the art.

Thus, this invention provides a new sales transaction system based on electronic data processing principles and which can function and process information at high speeds. A large number of clerk stations can be handled sequentially without slowing up the clerk operations. At the same time, inventory updating can be performed as well as monitoring by management of the store operations. The equipment at the clerk stations requires but a small space; it is quiet in operation, easy to operate, and effective. The overall transaction central may be small in size with presently available components, and the size compares favorably with the bulky cash registers that are replaced.

This invention may be used with various types of memories, and cyclic memories such as the continuously rotating magnetic drum described above are advantageous in various operations of the system and from the standpoint of the relative expense for the amount of data to be stored and processed. Other cyclic memories (for example, recirculating delay lines such as mercury or shift register delay lines) may also be used.

The sales transaction system of this invention may be expanded or contracted to accommodate a larger or smaller number of clerk stations and more than one monitor station or none. Likewise, the inventory operations may be expanded as noted above. For larger systems it may be desirable to decouple the print-out operation at each station from the transaction central to avoid any time loss due to a print-out conflict. This may be done by providing a separate print-out register at each station to receive the information signals directly from the Output Selector gates 406 to 412. Thereby, the output information is established at the proper station register directly and is stored there while its station performs the print-out. The transaction central is then able to process the succeeding station's operations independently of that print-out operation. Moreover, all or some of the various inventory, activity, and monitoring operations may be eliminated and the system restricted to the arithmetic operations (without the special tax operations) for each transaction at the clerk stations. With such a restricted system, much of the Program Control unit is not required. Such a restricted system would incorporate the Input Selector, Timing Generator, Sequencer, cyclic memory, Serial Adder and Output Selector connected in the manner described above. In addition, the program comparator is utilized to address the memory location associated with the coupled station. Thereby, a relatively inexpensive system is formed which is especially useful on a stand-by basis.

What is claimed is:

1. A sales transaction system comprising a plurality of clerk operated stations for supplying signals representing a plurality of different transaction categories together with transaction information signals; and a transaction central including a memory for storing said transaction information signals at different addresses identified by said category signals, an arithmetic unit for processing said transaction information signals from said stations and said memory in accordance with a certain program sequence, a program control unit for developing said program sequence from said category signals, and means for controlling the coupling of said stations to said transaction central in a certain sequence, said controlling means including means for repeatedly supplying individual station control signals in said sequence to couple the associated stations to said transaction central for supplying their signals thereto.

2. A sales transaction system comprising a plurality of clerk operated stations for supplying signals representing a plurality of different transaction categories together with transaction information signals; and a transaction central including a continuously cycling memory for storing said transaction information signals at different addresses identified by said category signals, an arithmetic unit for processing said transaction information signals from said stations and said memory in accordance with a certain program sequence, a program control unit for developing said program sequence from said category signals, and means for controlling the coupling of said stations to said transaction central in a certain sequence, said controlling means including means operative on successive cycles of said memory for repeatedly supplying individual station control signals in said sequence to couple the associated stations to said transaction central for supplying their signals thereto.

3. A sales transaction system as recited in claim 2 wherein said means for repeatedly supplying station control signals includes means for registering signals representing successive cycles of said memory, and means responsive to the signals of said registering means and to ready signals from said stations for generating said station control signals.

4. A sales transaction system as recited in claim 3 wherein said registering means includes means for counting said memory cycles and for recycling upon a count corresponding to the number of said stations.

5. A sales transaction system comprising a plurality of clerk operated stations for supplying signals representing a plurality of different transaction categories together with transaction information signals; and a transaction central including a memory for storing said transaction information signals at different addresses identified by said category signals, an arithmetic unit for processing said transaction information signals from said stations and said memory in accordance with a certain program sequence, a program control unit for developing said program sequence from said category signals, means for controlling the coupling of said stations to said transaction central in a certain sequence, said controlling means including means for repeatedly supplying individual station control signals in said sequence to couple the associated stations to said transaction central for supplying their signals thereto, and means for supplying signals from said memory to the coupled station in response to certain of the category signals supplied thereby.

6. A sales transaction system comprising a plurality of clerk operated stations for supplying signals representing a plurality of different transaction categories together with transaction information signals; and a transaction central including a continuously cycling memory for storing said transaction information signals at different addresses identified by said category signals, an arithmetic unit for processing said transaction information signals from said stations and said memory in accordance with a certain program sequence, a program control unit for developing said program sequence from said category signals, said arithmetic unit being coupled to continuously receive signals from said memory and to supply the output signals thereof back to said memory after a uniform time delay, means for selectively supplying said station information signals to said arithmetic unit in accordance with said program sequence, and means for controlling the coupling of said stations to said transaction central in a certain sequence, said controlling means including means operative on successive cycles of said memory for repeatedly supplying individual station control signals in said sequence to couple the associated stations to said transaction central for supplying their signals thereto.

7. A sales transaction system as recited in claim 6 and further comprising means for selectively supplying the output signals of said arithmetic unit to the coupled station.

8. A sales transaction system as recited in claim 7 wherein said output signal supplying means is coupled to selectively supply said output signals back to the input of said arithmetic unit.

9. A sales transaction system as recited in claim 6 wherein said cyclic memory has a plurality of channels, said arithmetic unit includes a plurality of means individually coupled to said memory channels for processing the signals stored in the associated channel and for returning the processed signals thereto after a uniform time delay.

10. A sales transaction system as recited in claim 9 wherein one of said processing means includes means for selectively combining the associated memory channel signals and said station information signals, and another of said processing means includes means for combining an incrementing signal and the associated memory channel signals, and said transaction central includes means for supplying said incrementing signal to said other processing means in response to certain signals received from the coupled station.

11. A sales transaction system comprising a plurality of clerk operated stations for supplying signals representing a plurality of different transaction categories together with transaction information signals, and a monitor station for supplying information request signals that include category signals; and a transaction central including a memory for storing said transaction information signals at different addresses identified by said category signals, an arithmetic unit for processing said transaction information signals from said stations and said memory in accordance with a certain program sequence, a program control unit for developing said program sequence from said category signals, means for supplying information signals from said memory to said monitor station in accordance with said request signals, and means for controlling the coupling of said stations to said transaction central in a certain sequence, said controlling means including means for repeatedly supplying individual station control signals in said sequence to couple the associated stations to said transaction central for supplying their signals thereto.

12. A sales transaction system comprising a plurality of clerk operated stations each having means for selectively supplying signals representative of transaction price data, of the departments associated with the transactions, and of certain control operations, a monitor station for selectively supplying information request signals representative of the clerk stations, of said departments, and of certain control operations, each of said stations having an output device; and a transaction central including a memory having certain portions respectively associated with said clerk stations and said departments, means for controlling the coupling of said stations to said transaction central in repeated sequences, an arithmetic unit for totaling price data signals from said memory and from said clerk stations and for incrementing department data signals from said memory, control means responsive to control signals from the coupled one of said clerk stations for supplying to said arithmetic unit signals from the associated station portion of said memory together with the transaction price data signals from the coupled station and for supplying to said arithmetic unit signals from the department portion of the memory associated with the department signals from the coupled station and for returning the output signals of said arithmetic unit to said memory, and means for selectively supplying to the coupled clerk station output device signals relating only to price data totals from the associated memory portion and to the coupled monitor station signals relating to department data totals from the memory portion associated with the request signals therefrom.

13. A sales transaction system as recited in claim 12 wherein said monitor station is adapted for selectively supplying request signals representative of a total of transaction price data of all stations, said memory has a certain portion associated with said total price data, and said control means is responsive to control signals from the coupled one of said clerk stations for supplying to said arithmetic unit signals from the total price memory portion together with the transaction price data signals from the coupled station.

14. A sales transaction system as recited in claim 13 wherein said memory is a continuously rotating magnetic drum having a plurality of channels with information signals stored serially therein respectively associated with said stations and said departments, and said arithmetic unit includes separate means for serially processing the signals from said channels.

15. A sales transaction system comprising a plurality of clerk stations, and a monitor station, each of said clerk stations including keyboard operated means for establishing information signals related to item prices of a transaction, related to the identity of the item departments and the clerks, and related to the data processing operation to be performed, and means for printing transaction information data; a transaction central including input means for receiving signals from said stations, a cyclic memory having a plurality of parallel channels for storing different categories of transaction information signals at memory locations associated with said clerk stations, departments and clerks, a plurality of arithmetic units respectively associated with said channels for receiving information signals therefrom and from said input means and for recirculating information signals to the associated channels in a certain phase relationship, output means for receiving information signals from said arithmetic units and for supplying signals to said stations, program means for controlling the processing and handling of information signals from said memory and said input means by said arithmetic units and for controlling the passage of information signals to said output means in accordance with signals received by said input means from said stations, and means for controlling the coupling of said stations to said input and output means in a certain repeated sequence, said coupling controlling means including means operative on successive cycles of said memory for repeatedly supplying individual station control signals to couple the associated station to said input and output means in said sequence.

16. An information updating system comprising a plurality of data input stations each having means for selectively supplying information data signals including signals representative of a different item in each of a plurality of information categories, a monitor station for selectively supplying information request signals representative of said information items and categories and having an output device; a transaction central including a continuously cycling memory having different channels respectively associated with said categories and different portions associated with said items, a plurality of arithmetic units individually associated with said memory channels for receiving data signals from the associated channels and updating signals in accordance with said information data signals and for developing updated data signals therefrom, and a program control unit responsive to said category and item signals for controlling over each memory cycle the supply to said arithmetic unit of corresponding signals from said memory channels and of said updating signals and the return of the updated signals to said memory channels; means for coupling successive ones of said input and monitor stations to said transaction central upon each memory cycle and in repeated sequences, and means responsive to the request signals for supplying to the requesting station the requested updated signals from said memory.

17. An information updating system as recited in claim 16 wherein said memory has portions individually assoicated with each input station and portions associated in common with a plurality of said stations, and each of said input stations includes means for supplying item signals individually associated therewith, and said monitor station includes means for supplying request signals associated with said common memory portions.

18. An information updating system as recited in claim 17 wherein each of said input stations includes an output device and means for supplying request signals for updated information only from those memory portions individually associated therewith.

19. An information updating system as recited in claim 16 wherein said program control unit develops different sequences of control signals in accordance with the category and item signals supplied by said input stations to produce a plurality of arithmetic operations over a memory cycle.

References Cited by the Examiner
UNITED STATES PATENTS

| | | | |
|---|---|---|---|
| 3,029,414 | 4/62 | Schrimpf | 340—172.5 |
| 3,099,512 | 7/63 | Kohler | 340—172.5 |

MALCOLM A. MORRISON, *Primary Examiner.*

R. C. BAILEY, *Examiner.*

UNITED STATES PATENT OFFICE
CERTIFICATE OF CORRECTION

Patent No. 3,181,124                                    April 27, 1965

David G. Hammel

It is hereby certified that error appears in the above numbered patent requiring correction and that the said Letters Patent should read as corrected below.

Column 4, line 71, for "therefore" read -- therefor --; column 5, line 11, for "one" read -- ones --; column 7, line 56, for "feedbback" reac -- feedback --; column 9, line 24, for "fiip-" read -- flip- --; line 31, for "squencing" read -- sequencing --; line 55, for "stopped" read -- stepped --; column 15, lines 30 and 31, for "defferent" read -- different --; column 16, line 21, for "10" read -- ten --; column 18, line 62, for "end" read -- and --; column 19, line 11, for "442" read -- 422 --; line 70, for "its" read -- is --; line 74, for "response" read -- responsive --; column 20, line 10, for "Item a" read -- Item-a --; line 73, after "-2," insert -- the recirculated --; column 21, line 70, after "again" insert -- at --; column 24, line 59, for "(which" read -- , which --; column 30, lines 48 and 49, for "assoicated" read -- associated --.

Signed and sealed this 26th day of October 1965.

(SEAL)
Attest:

ERNEST W. SWIDER                           EDWARD J. BRENNER
Attesting Officer                          Commissioner of Patents